(12) United States Patent
Tanase et al.

(10) Patent No.: US 6,997,473 B2
(45) Date of Patent: Feb. 14, 2006

(54) SIDE AIRBAG DEVICE

(75) Inventors: Toshinori Tanase, Aichi (JP); Yoshio Mizuno, Aichi (JP); Toru Koyama, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 168 days.

(21) Appl. No.: 10/416,018

(22) PCT Filed: Jun. 7, 2002

(86) PCT No.: PCT/JP02/05659

§ 371 (c)(1),
(2), (4) Date: May 12, 2003

(87) PCT Pub. No.: WO02/100690

PCT Pub. Date: Dec. 19, 2002

(65) Prior Publication Data

US 2004/0021304 A1  Feb. 5, 2004

(30) Foreign Application Priority Data

| Jun. 8, 2001 | (JP) | ............................ 2001-174097 |
| Sep. 17, 2001 | (JP) | ............................ 2001-281622 |
| Oct. 9, 2001 | (JP) | ............................ 2001-311384 |
| Oct. 18, 2001 | (JP) | ............................ 2001-320154 |
| Dec. 13, 2001 | (JP) | ............................ 2001-380513 |
| Dec. 19, 2001 | (JP) | ............................ 2001-386281 |

(51) Int. Cl.
*B60R 21/22* (2006.01)

(52) U.S. Cl. ................................................. 280/730.2
(58) Field of Classification Search ............ 280/730.2, 280/730.1, 728.2, 743.2
See application file for complete search history.

(56) References Cited

U.S. PATENT DOCUMENTS

| 5,890,732 | A  | * | 4/1999 | Nakamura et al. ........... 280/729 |
| 6,209,919 | B1 | * | 4/2001 | Nilsson et al. .............. 280/735 |
| 6,349,964 | B1 | * | 2/2002 | Acker et al. ............. 280/730.2 |
| 6,561,539 | B1 | * | 5/2003 | Sunabashiri et al. ...... 280/730.1 |
| 6,783,151 | B1 | * | 8/2004 | Rasch et al. ................. 280/729 |

FOREIGN PATENT DOCUMENTS

| EP | 1008494 A2 | 6/2000 |
| JP | A-H09-272393 | 10/1997 |
| JP | A-H10-67297 | 3/1998 |
| JP | A-H10-147201 | 6/1998 |
| JP | A-H11-34786 | 2/1999 |
| JP | A-2000-85515 | 3/2000 |
| JP | A-2000-177527 | 6/2000 |
| JP | A-2001-114060 | 4/2001 |

* cited by examiner

*Primary Examiner*—Faye M. Fleming
(74) *Attorney, Agent, or Firm*—Posz Law Group, PLC

(57) ABSTRACT

A side air bag device includes an inflator arranged in a backrest of a seat for discharge gas, an air bag having an upper chamber and a lower chamber which are each inflated by discharging gas, and an impact reducing means reducing means ror reducing impact that is applied to a passenger when the air bag contacts the passenger during inflation of the air bag.

8 Claims, 29 Drawing Sheets

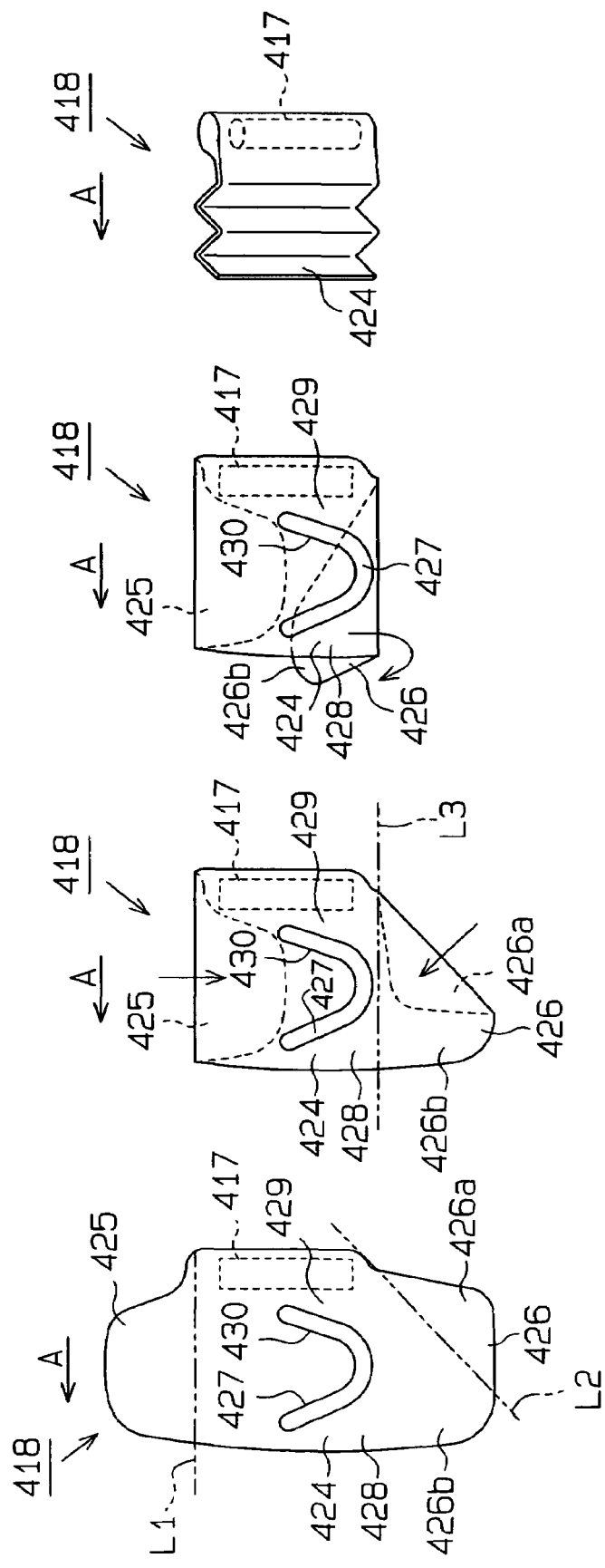

Fig.22(a)     Fig.22(b)
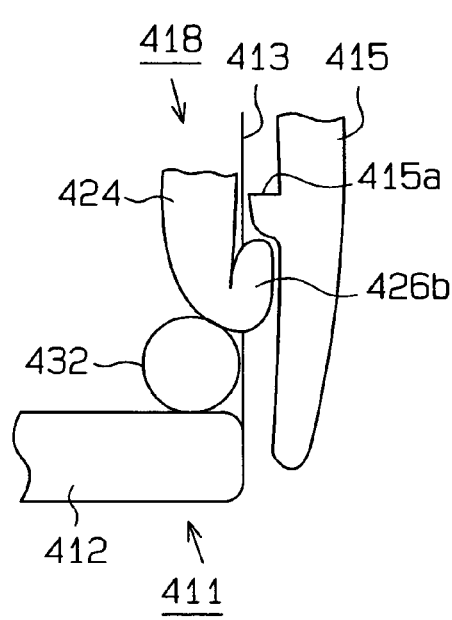
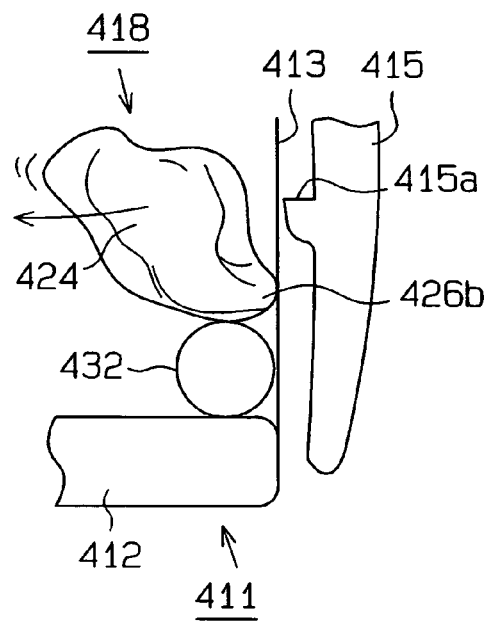
Fig.23(a)    Fig.23(b)    Fig.23(c)
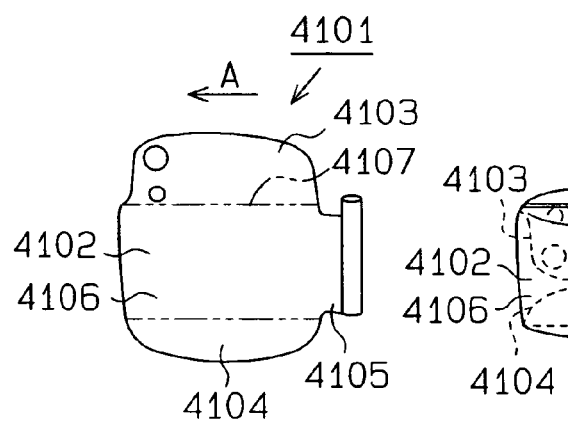
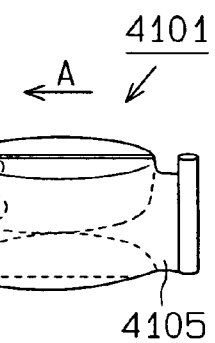
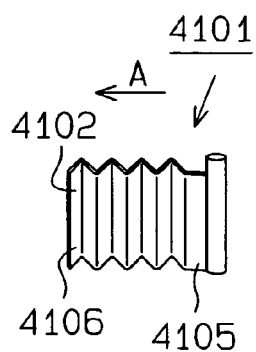

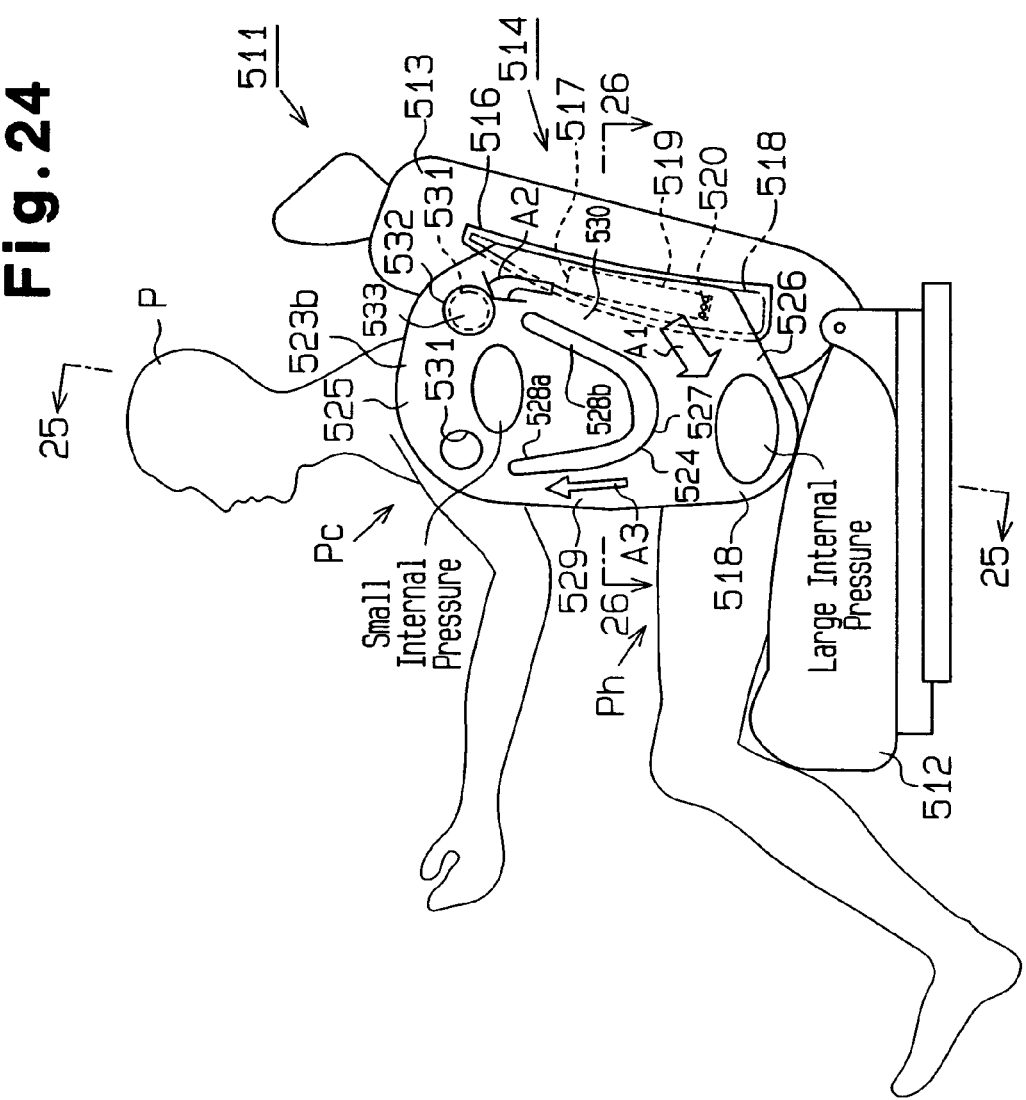

SIDE AIRBAG DEVICE

BACKGROUND OF THE INVENTION

The present invention relates to an air bag device, which operates when impact that is greater than or equal to a predetermined value is applied to the body of, for example, a vehicle, to protect passengers from the impact. More particularly, the present invention relates to a vehicle seat in which a side air bag device is installed.

Such a side air bag device includes an air bag that is inflated between a sidewall of a vehicle body and a passenger who is sitting in a vehicle seat arranged in the vehicle. The side air bag device includes an inflator that discharges inflation gas into the air bag. When the impact applied to the sidewall of the vehicle body is greater than or equal to a predetermined value, the inflator discharges inflation gas to inflate the air bag instantaneously. As a result, the effect of the impact on the passenger is absorbed.

For example, Japanese Laid-Open Patent Publication No. 2000-177527 proposes a side air bag device, which inflates an air bag to the vicinity of a seat surface of a seat. The device especially protects the lumbar region of the passenger in a satisfactory manner and has a superior effect for protecting the passenger.

In the above device, an inflator discharges gas in the direction of the lower end of the air bag, such that the lower portion of the air bag, which corresponds to the lumbar region of the passenger, is inflated quickly.

In this prior art side air bag device, the air bag is required to be inflated to the vicinity of the seat surface. This enlarges the air bag. Accordingly, the inflator must discharge a large amount of inflation gas under high pressure to inflate the air bag quickly.

Additionally, in the device, when an obstacle is placed in the inflation range of the air bag, such as on the surface of the seat, the air bag may be inflated in a state where the obstacle gets caught between the air bag and the seat.

In such a case, during the process in which the air bag is inflated, the inflation gas discharged from the inflator toward the lower end of the air bag impacts the portion where the obstacle is caught in the air bag. Thus, the flow direction of the inflation gas is deflected in an unintended direction. The deflected inflation gas, for example, causes a deviation in the inflation position of the air bag and destabilizes the inflation state of the air bag.

BRIEF SUMMARY OF THE INVENTION

The present invention provides an air bag device, which may be mounted on the backrest of a vehicle seat. The air bag device includes a gas discharging means arranged in the backrest for discharging gas, an air bag including an upper chamber and a lower chamber, which are each inflated by discharging gas, and an impact reducing means for reducing impact applied to a passenger when the air bag contacts a passenger sitting on the seat during inflation of the air bag.

In a first embodiment of the present invention, the impact reducing means is a tube connected to an inflator.

In a second embodiment of the present invention, the impact reducing means is a tether arranged in the lower chamber of the air bag to oppose the discharge direction of the gas.

In a third embodiment of the present invention, the impact reducing means is a variable vent mechanism formed on the air bag in the lower chamber.

In a fourth embodiment of the present invention, the impact reducing means is part of the air bag corresponding to the lower chamber and is formed by a part folded in an oblique direction relative to an inflation direction of the air bag in a state prior to inflation of the air bag.

In a fifth embodiment of the present invention, the impact reducing means includes a communication means arranged in the air bag to place the upper chamber in communication with the lower chamber.

In a sixth embodiment of the present invention, the impact reducing means includes first and second communication means arranged in the air bag to communicate the upper chamber with the lower chamber. The first and second communication means respectively include first and second gas communication passages, and the second gas communication passage is narrower than the first gas communication passage.

The present invention further provides a vehicle seat. The vehicle seat has a sitting portion and a backrest, which includes a side air bag. The air bag is connected to the sitting portion and is inflated when impact applied to a side of the vehicle is greater than or equal to a predetermined value. A surface of the sitting portion is flat in the vicinity of the inflation range of the side air bag.

BRIEF DESCRIPTION OF THE DRAWINGS

FIGS. 21(a) to 21(d) are diagrams illustrating a method for folding the air bag of FIG. 18.

FIGS. 22(a) and 22(b) are diagrams showing the inflation state of the air bag when there is an obstacle on the seat.

FIGS. 23(a) to 23(c) are diagrams illustrating a method for folding the prior art air bag.

FIG. 24 is a side view of a side air bag device according to a fifth embodiment of the present invention.

DETAILED DESCRIPTION OF THE PREFERRED EMBODIMENTS

A side air bag device according to a first embodiment will now be described.

Figure 1:
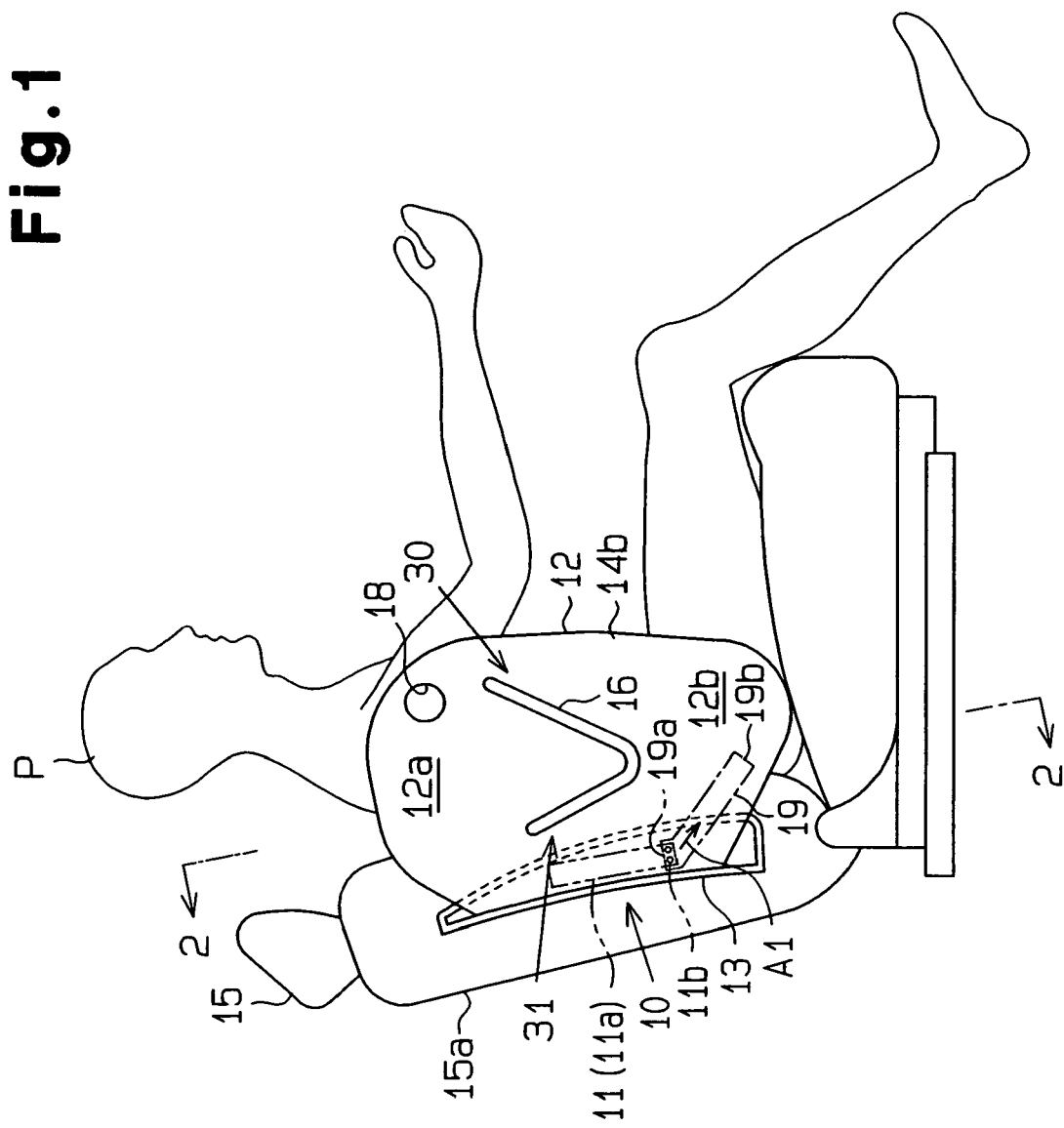
FIG. 1 is a schematic side view of a side air bag device according to a first embodiment of the present invention that is installed in a seat.

Referring to FIG. 1, a side air bag device 10 of the first embodiment includes an inflator 11, which serves as a gas discharging means, an air bag 12, which covers the inflator 11, and a case 13, which accommodates the inflator 11 and the air bag 12.

The inflator 11, the air bag 12, and the case 13 are mounted on a frame (not shown) of the backrest 15a of a vehicle seat 15 at an end portion of the backrest 15a near a vehicle body (not shown) and embedded in the end portion.

A sensor (not shown) is arranged on the body to detect an impact applied to the body. The sensor is connected to a control circuit (not shown), which controls the inflator 11 in accordance with a detection signal from the sensor.

The inflator 11 includes a case 11a, which is arranged along the longitudinal direction the backrest 15a. A gas discharge nozzle 11b is arranged in the vicinity of the lower portion of the case 11a to discharge gas, which is generated in the case 11a, into the air bag 12. The inflator 11 is arranged to discharge gas toward the lower end of the air bag 12 (indicated by arrow A1).

Figure 2:
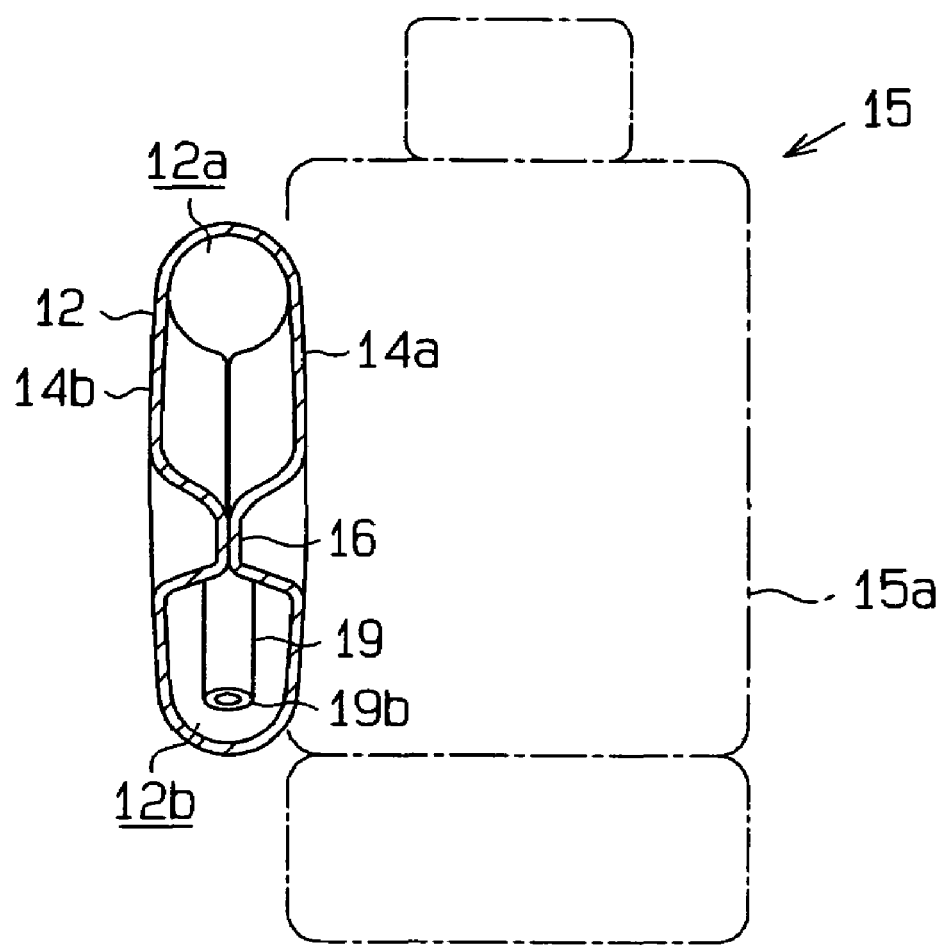
FIG. 2 is a cross sectional view of the side air bag device taken along line 2—2 in FIG. 1.

The air bag 12 will now be described with reference to FIGS. 1 and 2. FIG. 2 is a cross sectional view of the air bag 12 taken along line 2—2 in FIG. 1. To facilitate understanding, the thickness of the base fabric of the air bag 12 is illustrated thicker than actual.

The air bag 12 is formed to be bag-like by sewing two base fabrics 14a and 14b, which have undergone, for example, a fire resistant treatment. In FIG. 1, the air bag 12 is shown in an inflated state between a passenger P who is sitting in the seat 15, and a sidewall of the vehicle. However, the air bag 12 is folded and stored in the case 13 prior to inflation.

The air bag 12 includes a connector 16 that defines an upper chamber 12a, which is inflated at a position corresponding to the thorax region of the passenger P, and a lower chamber, which is inflated at a position corresponding to the lumbar region of the passenger P.

The connector 16 is formed by integrally sewing part of the base fabrics 14a and 14b, which are opposed to each other in the lateral direction of the vehicle. The connector 16 maintains the part of the base fabrics 14a and 14b opposed in the lateral direction of the vehicle in a connected state when the inflator 11 supplies gas to the inner side of the air bag 12.

The connector 16 is generally V-shaped and located near the middle of the surface of the air bag 12 that opposes the sidewall of the vehicle when the air bag 12 is inflated. A front passage 30 having a predetermined length is formed between a first end of the connector 16, which is located at the forward side of the vehicle, and the inner surface of the air bag 12. A rear passage 31 having a predetermined length is formed between a second end of the connector 16, which is located at the rearward side of the vehicle, and the inner surface of the air bag 12. The upper chamber 12a and the lower chamber 12b are in communication with each other through the front and rear passages 30 and 31. Each of the front and rear passages 30 and 31, which has a cross sectional area that is gradually reduced from the lower end to the upper end when the air bag 12 is inflated, functions as a throttling passage.

In the upper chamber 12a, a vent hole 18 is formed in the base fabric 14b of the air bag 12 to connect the upper chamber 12a to the outer side. Inflation gas supplied to the inner side of the air bag 12 is externally discharged from the air bag 12 through the vent hole 18.

The side air bag device 10 of the first embodiment includes an inner tube 19 to change the flow direction of inflation gas discharged from the inflator 11 in accordance with inflation state of the air bag 12. The inner tube 19 functions as an impact reducing means and a communication means (gas flow passage).

The inner tube 19 is tubular and has a basal end (fixed end) 19a, which is fixed to the lower end of the inflator 11. The fixed end 19a of the inner tube 19 has an opening connected to the gas discharge nozzle 11b of the inflator 11. The inner tube 19 extends to the lower end of the air bag 12 from the gas discharge nozzle 11b in the air bag 12. The inner tube 19 has a distal end (movable end) 19b, the opening of which opens to the inner side of the air bag 12.

The inner tube 19 is made of the same material as that of the base fabrics 14a and 14b of the air bag 12. Since the material of the base fabrics is flexible, the movable end 19b of the inner tube 19 is movable in the air bag 12.

Figure 3A:
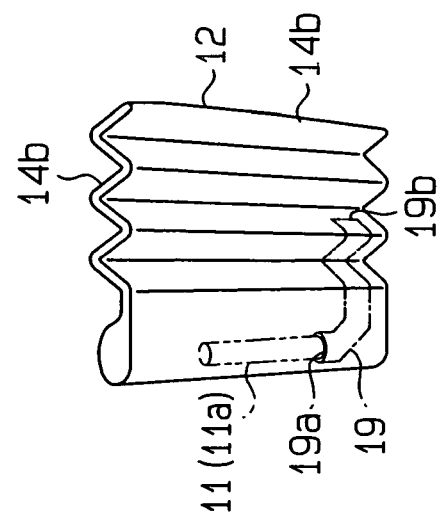
FIGS. 3(a) to 3(c) are diagrams illustrating a method for folding an air bag of the side air bag device of FIG. 1.
Figure 3B:
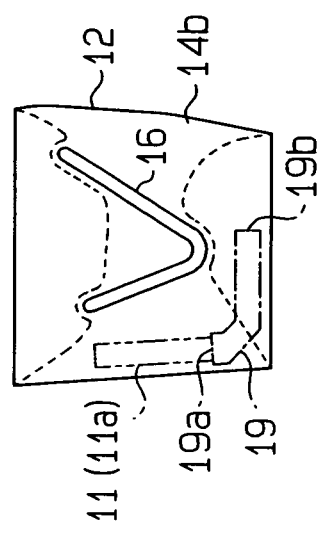
Figure 3C:
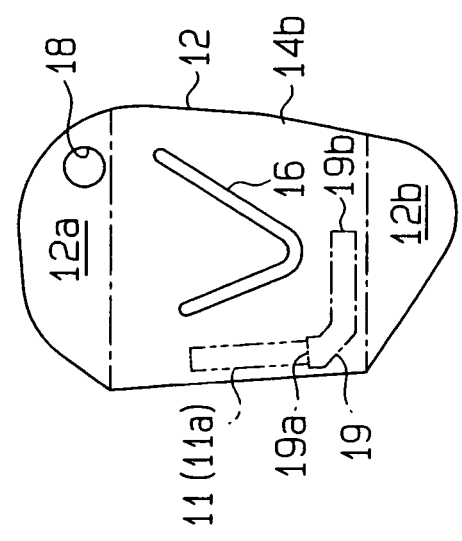

A method for folding the air bag 12 when storing the air bag 12 in the case 13 will now be described with reference to FIGS. 3(a) to 3(c). FIGS. 3(a) to 3(c) show the side surfaces of the air bag 12 in a folding process for the air bag 12.

As shown in FIG. 3(a), the inner tube 19 is first bent such that most of the inner tube 19 extends in the horizontal direction. Then, the upper portion and lower portion of the air bag 12 are folded into the air bag 12, as shown in FIG.

3(b). Subsequently, the air bag 12 is sequentially folded in an accordion-like manner in the lateral direction of the air bag 12, as shown in FIG. 3(c). In this manner, the air bag 12, which is folded as described above, is stored in the case 13.

Figure 4:
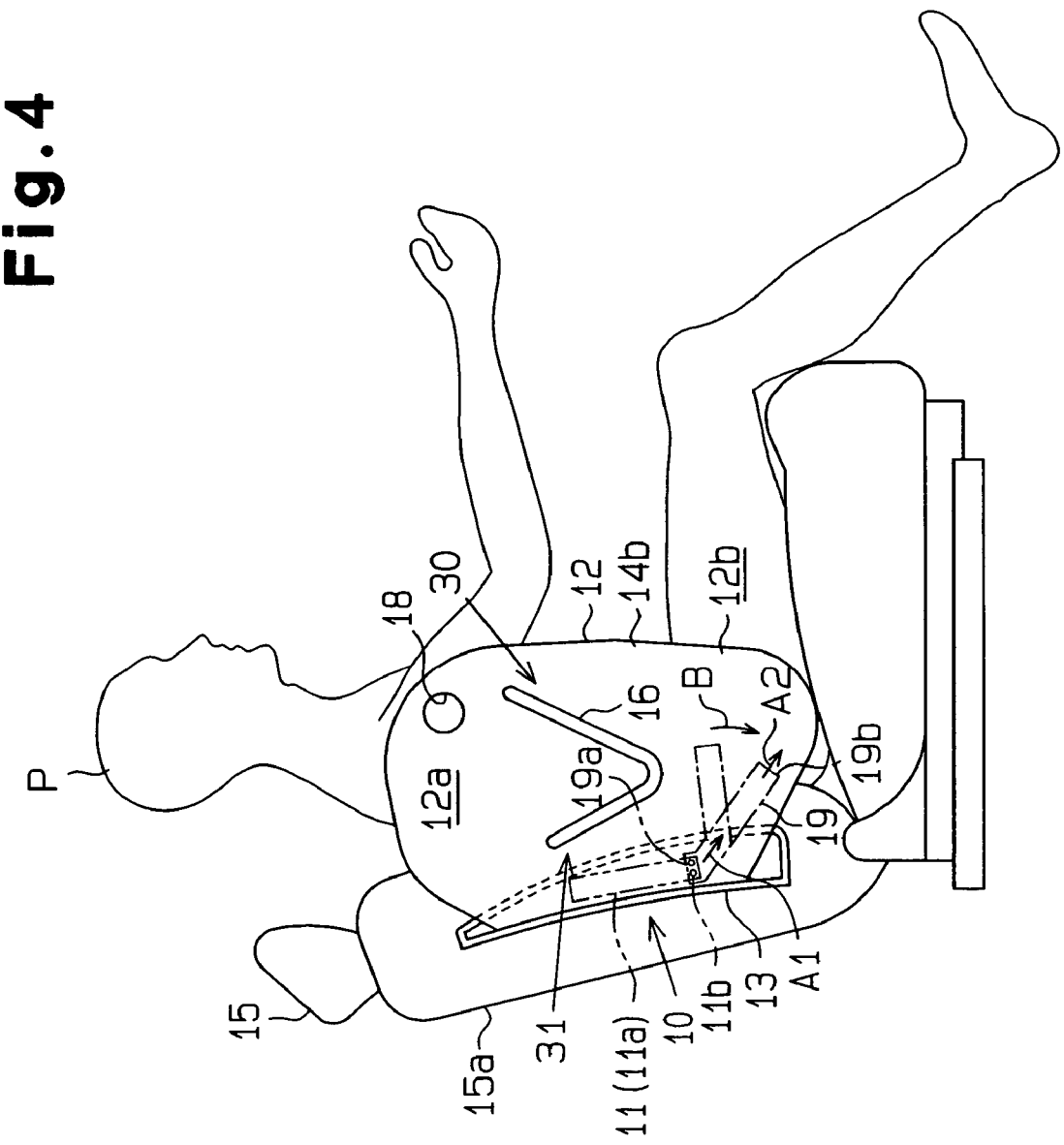
FIG. 4 is a schematic side view illustrating the operation of an inner tube when the air bag of the side air bag device of FIG. 1 is inflated.

In the air bag device 10 of the above structure, the control circuit outputs an operation signal to the inflator 11 when the sensor detects an impact that is greater than or equal to a predetermined value. In response to the operation signal, inflation gas is discharged toward the lower end of the air bag 12 from the gas discharge nozzle 11b of the inflator 11 instantaneously, as shown in FIG. 4. In this state, the discharged inflation gas is discharged into the air bag 12 through the inner tube 19 to start inflating the air bag 12.

When the air bag 12 is inflated, first, the inner tube 19 is gradually extended from the folded state by the pressure of inflation gas discharged into the inner tube 19. The inner tube 19 is ultimately unfolded and moved downward when the air bag 12 is inflated in a normal manner (that is, when there is no obstacle between the seat 15 and the air bag 12), as indicated by arrow B in FIG. 4. The movement discharges inflation gas toward the lower end of the air bag 12 (in the direction indicated by arrow A2) from the opening of the movable end 19b of the inner tube 19 and inflates the air bag 12 with the inflation gas.

The front and rear passages 30 and 31 function as throttling passages, the cross sectional areas of which are reduced from their inlets (lower sides) to the outlets (upper sides). Accordingly, the amount of inflation gas that flows into the upper chamber 12a is less than the amount of inflation gas that flows into the lower chamber 12b. Such distribution of the gas quickly inflates the lower chamber 12b (i.e., the portion of the air bag 12 corresponding to the lumbar region of the passenger P) and then inflates the upper chamber 12a (i.e., the portion of the air bag 12 corresponding to the thorax region of the passenger P) with a small delay.

A predetermined amount of the inflation gas discharged into the air bag 12 continuously flows out of the air bag 12 through the vent hole 18.

In the side air bag device 10, the inner tube 19, which is tubular and made of a flexible material, is connected to the gas discharge nozzle 11b of the inflator 11. The inflation gas discharged from the inflator 11 is discharged into the air bag 12 through the inner tube 19. Therefore, even if an obstacle on the seat 15 gets caught when the air bag 12 is inflated, the inflation gas discharged from the opening in the movable end 19b of the inner tube 19 is oriented in a direction that differs from the lower end direction A2 of the air bag 12.

Figure 5:
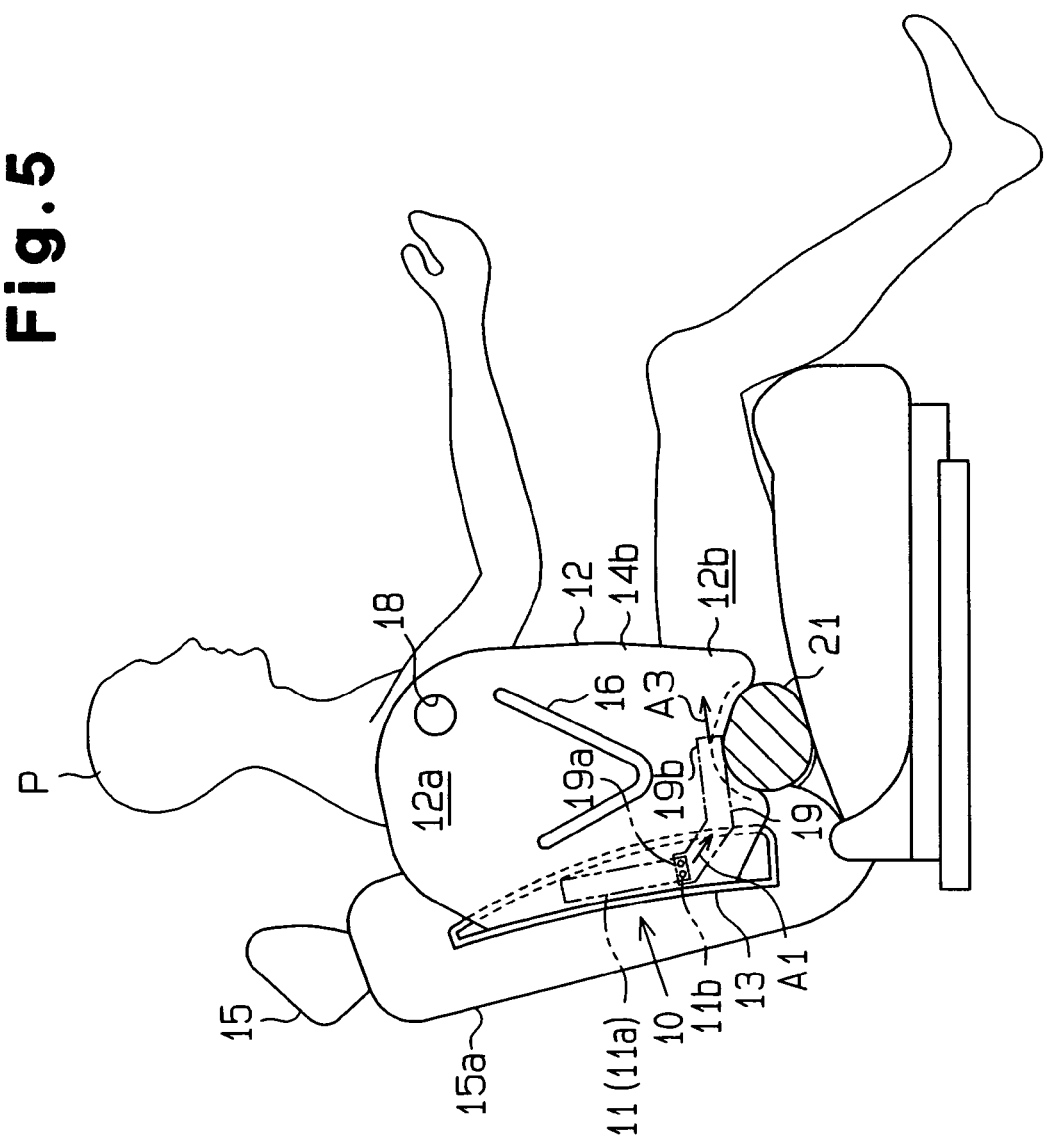
FIG. 5 is a schematic side view illustrating another operation of the inner tube when the air bag of the side air bag of FIG. 1 is inflated.

More specifically, when the air bag 12 contacts an obstacle 21 on the seat 15 during inflation and inflates in a state in which the obstacle gets caught in the air bag 12, the obstacle 21 deforms a lower portion of the lower chamber 12b in the air bag 12, as shown in FIG. 5. The deformed portion of the lower chamber 12b interferes with the inner tube 19. This prevents the inner tube 19 from being unfolded state and thus keeps the movable end 19b of the inner tube 19 folded.

As a result, the inflation gas discharged from the movable end 19b of the inner tube 19 is discharged in a direction differing from the lower end direction of the air bag 12 (in a forward direction A3 of the vehicle in this example). In this manner, the inflation gas is prevented in a desirable manner from being discharged toward the lower end of the air bag 12 when the air bag 12 is inflated in a state in which the obstacle 21 is caught between the air bag 12 and the seat 15. Thus, the inflation of the air bag 12 is maintained in a satisfactory state and the inflated air bag 12 applies less impact to the obstacle 21.

The side air bag device 10 according to the first embodiment has the following advantages.

(1) The side air bag device 10 includes the inner tube 19 that changes the flow direction of the inflation gas discharged from the inflator 11 in accordance with inflation state of the air bag 12. Accordingly, the flow direction of the inflation gas in the air bag 12 when the air bag 12 is inflated changes in direction in accordance with the present inflation state of the air bag 12.

Therefore, a large amount of high-pressure inflation gas is prevented from being discharged toward the lower end of the air bag 12 when the air bag 12 is inflated in a state in which the obstacle 21 on the seat 15 is caught in the air bag 12. This avoids the air bag 12 pressing the obstacle 21 with a strong force and prevents unstable inflation due to such pressing. Thus, the inflation of the air bag 12 is maintained in a satisfactory state and the inflated air bag 12 applies less impact to the obstacle 21. The obstacle 21 is not limited only to inanimate objects, and may be part of a passenger, such as the head.

(2) In the side air bag device 10, the inflator 11 discharges inflation gas in the lower end direction A2 of the air bag 12 when the air bag 12 is inflated in a normal manner. Therefore, the air bag 12 inflates the lower chamber 12b quickly during normal inflation of the air bag 12 when there is no obstacle 21 on the seat 15. This readily protects the lumbar region of the passenger P, and the passenger P is protected in a further satisfactory manner.

(3) In the side air bag device 10, the flow direction of the inflation gas changes from the lower end direction of the air bag 12 during inflation of the air bag 12 when there is an obstacle 21 on the seat 15. This prevents the inflation gas from being discharged toward the lower end of the air bag 12 and avoids a state in which the inflated air bag 12 presses the obstacle 21 with a strong force.

(4) The inner tube 19 is tubular and formed from flexible material. The fixed end 19a of the inner tube 19 is connected to the gas discharge nozzle 11b of the inflator 11 and the movable end 19b of the inner tube 19 is movable in the air bag 12.

Therefore, if the air bag 12 is deformed when contacting the obstacle 21 during inflation and the deformed portion of the air bag 12 interferes with the inner tube 19, the movable end 19b of the inner tube 19 remains folded. Accordingly, the flow of the inflation gas from the inner tube 19 is directed in a direction (e.g., horizontal direction) that differs from the lower end direction of the air bag 12. In other words, the inflation gas is prevented in a satisfactory manner from being discharged in the lower end direction of the air bag 12.

(5) The inner tube 19 is folded and stored in the case 13 such that most of the inner tube 19 extends in a generally horizontal direction when the air bag 12 is not inflated. Therefore, the inner tube 19 does not cause interference when folding the lower portion of the air bag 12. In addition, when the air bag 12 is inflated, the inflation gas is discharged from the opening in the movable end 19b of the inner tube while the pressure of the inflation gas discharged into the inner tube 19 extends the inner tube 19. This supplies the inflation gas in a desirable direction in accordance with inflation state of the air bag 12.

(6) The upper chamber 12a and the lower chamber 12b are in communication with each other through the front and rear passages 30 and 31. Thus, when a foreign object compresses any one of the two chambers and the internal pressure of the compressed chamber increases excessively, gas escapes into the other chamber through the two passages 30 and 31. As a result, the air bag 12 effectively absorbs an impact irrespective of where the impact is applied. This reduces the impact applied to the passenger. That is, the front and rear passages 30 and 31 function as an impact reducing means.

The first embodiment may be modified, as described below.

The case 13 may be omitted as long as the air bag 12 is stored and inflated appropriately.

The inflator 11 may be arranged, for example, in other parts of the air bag 12 or outside the air bag 12. In such a case, it is required that inflation gas be discharged in the lower end direction A1 of the air bag 12 and that the inner tube 19 be connectable to the gas discharge nozzle 11b.

The connector 16 may be formed though bonding or fusing in lieu of sewing. Further, the connector 16 may be formed by a tether, which integrally connects the base fabrics 14a and 14b. In addition, the connector 16 may be omitted.

In addition to the lower end direction A1 of the air bag 12, the inflation gas in the inflator 11 may be discharged in two or more directions including the lower end direction A1.

Instead of storing the inner tube in the above-described folded state, the inner tube 19 may be, for example, folded in a spiral-like manner or in an accordion-like manner. Further, the inner tube 19 may be formed by a plurality of tubes like a telescopic rod antenna so that it is shortened when folding the air bag 12.

Figure 6:
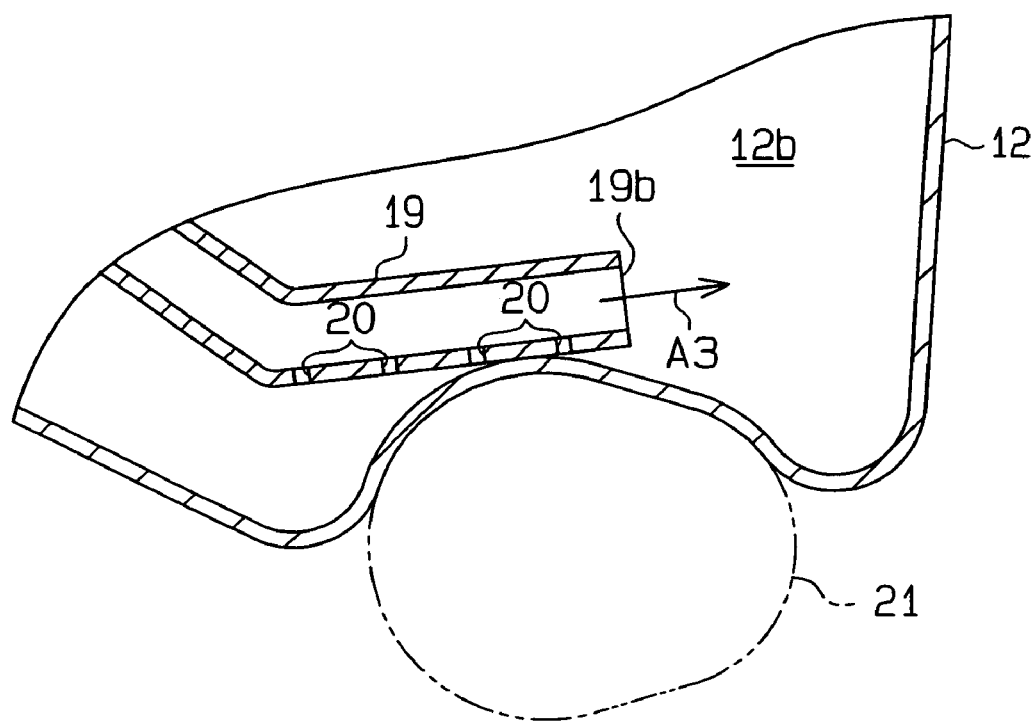
FIG. 6 is an enlarged side view showing a modification of the inner tube.

Referring to FIG. 6, communication holes 20 may be arranged on part of the outer surface of the inner tube 19 so that they oppose the lower end of the air bag 12 when the air bag 12 is inflated. In such a structure, inflation gas is discharged toward the lower end of the air bag 12 through the communication holes 20 even if the inner tube 19 is folded. That is, when the air bag 12 is inflated on the obstacle 21, inflation gas is discharged toward the lower end of the air bag 12 while maintaining the inflation of the air bag 12 in a stable state. This structure enables quick inflation of the lower chamber 12b of the air bag 12.

The inner tube 19 may be formed of materials other than that of the base fabrics 14a and 14b. In such a case, it is preferred that the materials have the required properties, such as flexibility, heat resistance, and strength.

The discharge direction of inflation gas may be changed as long as the lower chamber 12b of the air bag 12 is inflated quickly.

A plurality of inner tubes 19 may be used. Further, a plurality of branch tubes may branch off from the inner tube 19. Such a structure increases the flexibility of the directions in which inflation gas is discharged from the inner tube 19.

The side air bag device 10 of the present invention may be attached to, for example, a sidewall of the vehicle body instead of the backrest 15a of the seat 15. The side air bag device 10 is applicable to any one of a driver seat, a passenger seat, a rear seat, and a third seat.

A side air bag device 201 according to a second embodiment of the present invention will now be described with reference to FIGS. 7 to 9. The same reference numerals are used for elements identical to those in the first embodiment and the detailed description of such elements is omitted.

The side air bag device 210 of the second embodiment includes a tether 219, which blocks the flow of inflation gas discharged from the inflator 11 into the air bag 12 and which functions as an impact reducing means and a flow amount reducing means. The tether 219 reduces the amount of inflation gas, which reaches the lower end of the air bag 12.

The specific structure of the tether 219 will now be described with reference to FIGS. 8 and 9.

Figure 7:
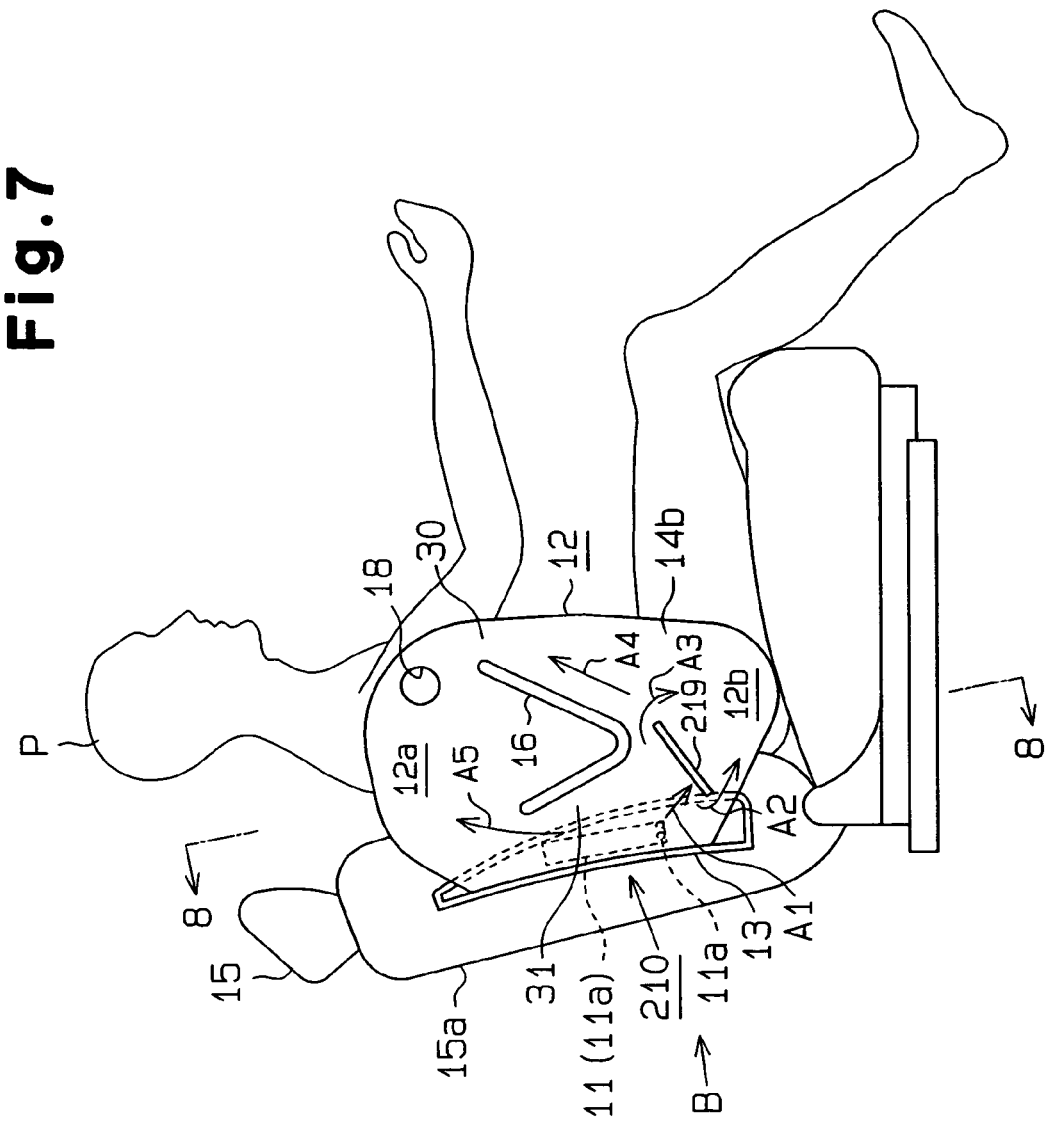
FIG. 7 is a schematic side view of a side air bag device according to a second embodiment of the present invention that is installed in a seat.
Figure 8:
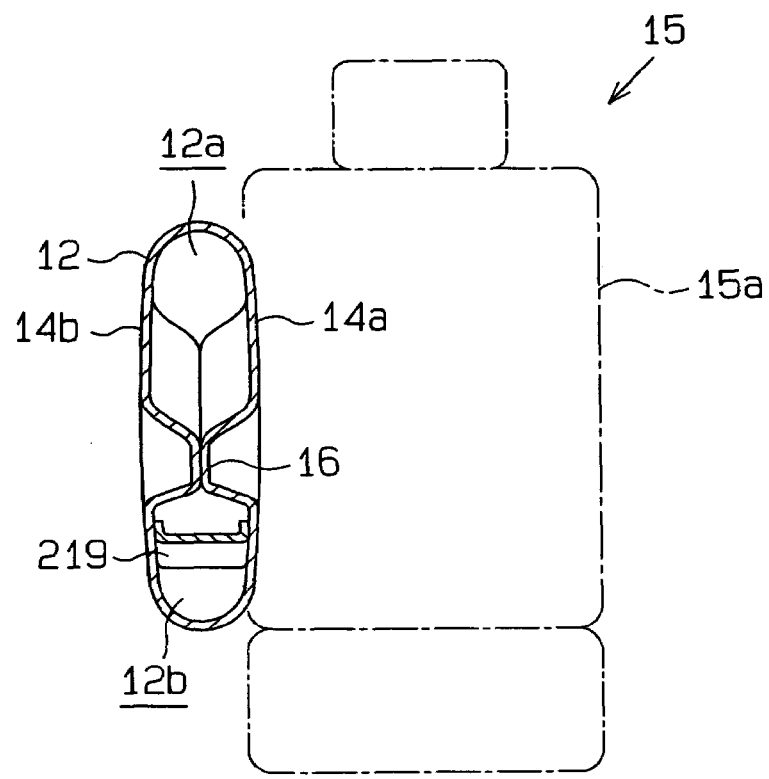
FIG. 8 is a cross sectional view of the side air bag device taken along line 8—8 in FIG. 7.
Figure 9:
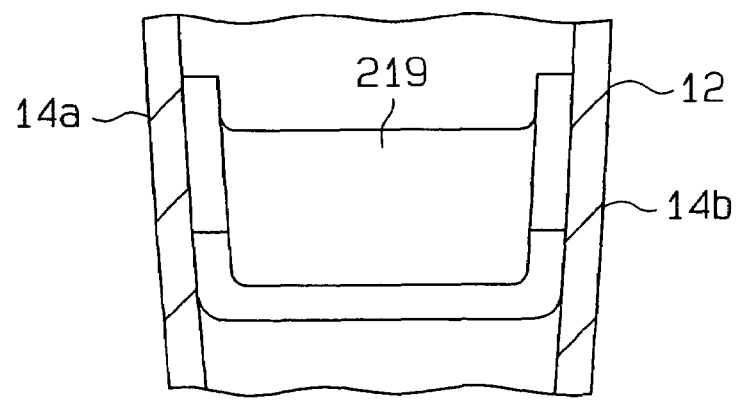
FIG. 9 is an enlarged view schematically showing a tether of the side air bag in FIG. 7.

FIG. 8 is a cross sectional view of the air bag 12 taken along line 2—2 in FIG. 7, and FIG. 9 is an enlarged view showing the tether 219.

Referring to FIGS. 8 and 9, the two lateral ends of the tether 219 are sewn to the base fabrics 14a and 14b, respectively. The tether 219 is made of the same material as that of the base fabrics 14a and 14b. The tether 219 extends in a direction intersecting the flow direction A1 of inflation gas discharged from the inflator 11 (See FIG. 7). More specifically, the tether 219 intersects the flow direction A1 of the inflation gas at an angle that is slightly smaller than a right angle. That is, the tether 219 is slightly inclined frontward from a point, at which the tether 219 intersects the flow direction A1 of the inflation gas. In other words, the tether 219 is inclined in an upward direction by a predetermined angle from a horizontal position.

When an impact activates the side air bag device 210, the inflator 11 instantaneously discharges inflation gas in the lower end direction A1 of the air bag 12 to start the inflation of the air bag 12. In this state, the flow of inflation gas discharged in the lower end direction A1 of the air bag 12 is blocked by the tether 219, as shown in FIG. 7. Accordingly, the tether 219 causes the inflation gas to flow in a direction detouring the tether 219. That is, the flow of inflation gas is divided into a flow detouring the tether 219 in a downward direction and a flowing detouring the tether 219 in an upward direction. The two flows are each directed to flow in the horizontal direction.

The inflation gas detouring the tether 219 in the downward direction flows into the lower chamber 12b along the inner surface of the air bag 12, as indicated by arrow A2 in FIG. 7. The inflation gas flow detours the tether 219 in the upward direction and flows into the lower chamber 12b (as indicated by arrow A3 in FIG. 7) and into the upper chamber 12a through the front passage 30 (as indicated by arrow A4 in FIG. 7).

Figure 10:
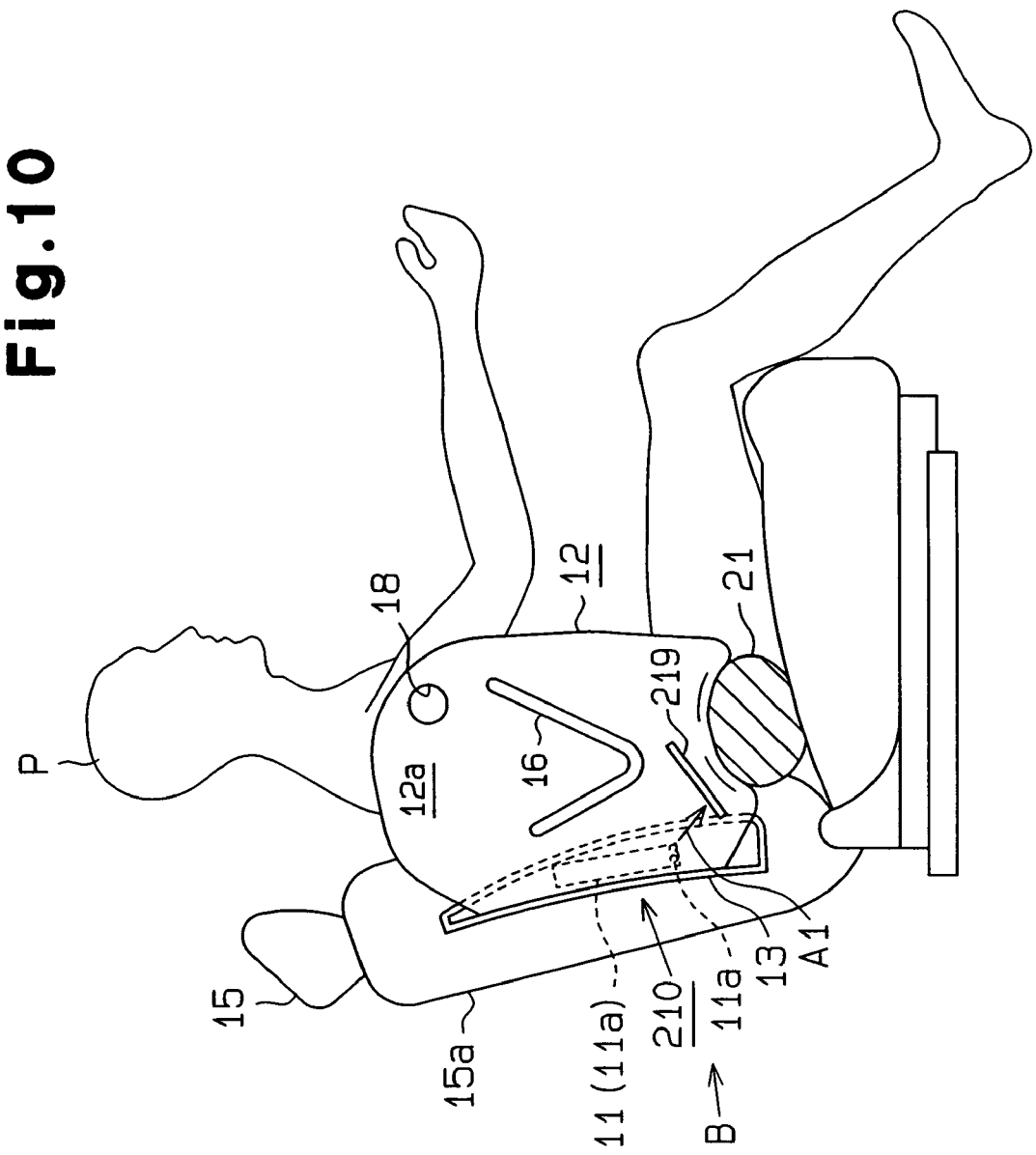
FIG. 10 is a schematic side view illustrating the operation of the side air bag device in FIG. 7.

As described above, the tether 219 blocks the flow of inflation gas, which is discharged from the inflator 11 in the lower end direction A1 of the air bag 12. Therefore, the inflation gas discharged from the inflator 11 does not directly reach the lower end of the air bag 12 during the inflation process of the air bag 12 and the flow amount of the inflation gas is reduced. This prevents in a satisfactory manner a large amount of high-pressure inflation gas from being discharged in the direction of the lower end of the air bag 12 from the inflator 11 even when the air bag 12 is inflated in a state when an obstacle 21 on the seat 15 is caught in the air bag 12, as shown in FIG. 10.

Accordingly, the side air bag device 10 according to the second embodiment has the following advantages.

(1) The tether 219 arranged in the air bag 12 prevents a large amount of high-pressure inflation gas from being discharged in the direction of the lower end of the air bag 12. That is, when there is an obstacle 21 on the seat 15, a large amount of inflation gas is prevented from being discharged to the lower end of the air bag 12, which corresponds to the obstacle 21. In other words, high-pressure inflation gas does not directly hit the portion in which the obstacle 21 is caught in the air bag 12. As a result, the inflation of the air bag 12 is maintained in a satisfactory state and the impact applied to the obstacle 21 by the inflated air bag 12 is reduced.

(2) The tether 219 deflects the flow of inflation gas from the inflator 11 in the lower end direction A1 of the air bag 12 to a direction close to the horizontal direction. This reduces the amount of the inflation gas, which reaches the lower end of the air bag 12.

The tether 219 causes some of the inflation gas to flow above the tether 219 and into the upper chamber 12a. Accordingly, even when the obstacle 21 is on the seat 15, the portion where the obstacle 21 is caught in the air bag 12 does not obstruct the inflation gas flowing to the upper chamber 12a. This enables quick inflation of the upper chamber 12a.

(3) The flow of inflation gas, which is discharged in the lower end direction A1 of the air bag 12 from the inflator 11, is blocked by simply arranging the tether 219 in the air bag 12.

The second embodiment may be modified, as described below.

A plurality of tethers 219 may be arranged. In this case, the tethers 219 may be arranged in a more flexible manner so that the direction in which the flow of inflation gas is deflected and the flow amount of inflation gas may be set in a more flexible manner.

The tether 219 may block some of the inflation gas discharged from the inflator 11 and allow the remaining inflation gas to flow to the lower end of the air bag 12. In such a case, the flow amount of some of the inflation gas is set to a value such that the air bag 12 is inflated in a stable manner. In this structure, the lower portion of the air bag 12 (i.e., the portion of the air bag 12 corresponding to the lumbar region of the passenger P) is inflated quickly.

Figure 11:
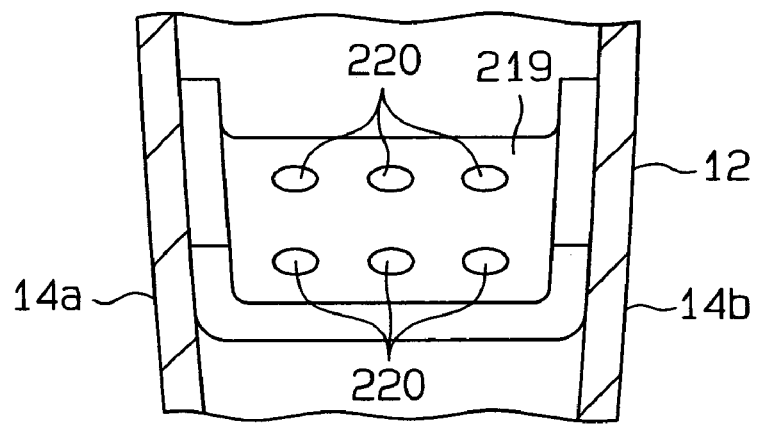
FIG. 11 is an enlarged view schematically showing a first modification of the tether.
Figure 12:
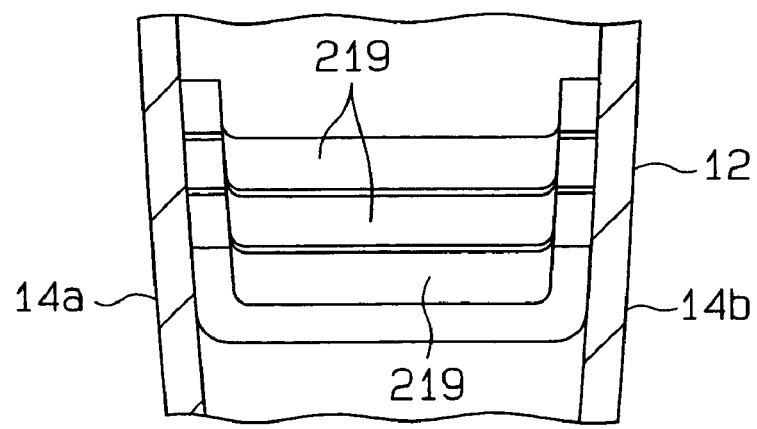
FIG. 12 is an enlarged view schematically showing a second modification of the tether.

Referring to FIG. 11, one or more through holes 220 may be, for example, arranged on the tether 219. Referring to FIG. 12, a plurality of tethers 219 may be arranged with a gap between each other. Further, the examples of FIGS. 11 and 12 may be combined if necessary. With such structures, inflation gas flows through the through holes 220 or the gaps without being blocked by the tether 219.

The tether 219 may have a curved or rectangular cross section. Further, the tethers 219 may have different shapes.

The tether 219 may be attached to the base fabrics 14a and 14b through bonding or fusing.

Instead of using the tether 219, the base fabrics 14a and 14b may be superimposed and sewn to each other to form a portion blocking the flow of the inflation gas.

Further, the flow of the inflation gas may be blocked by arranging, for example, a parachute-like blocking member at the gas discharge nozzle 11b instead of the tether 219.

Figure 13:
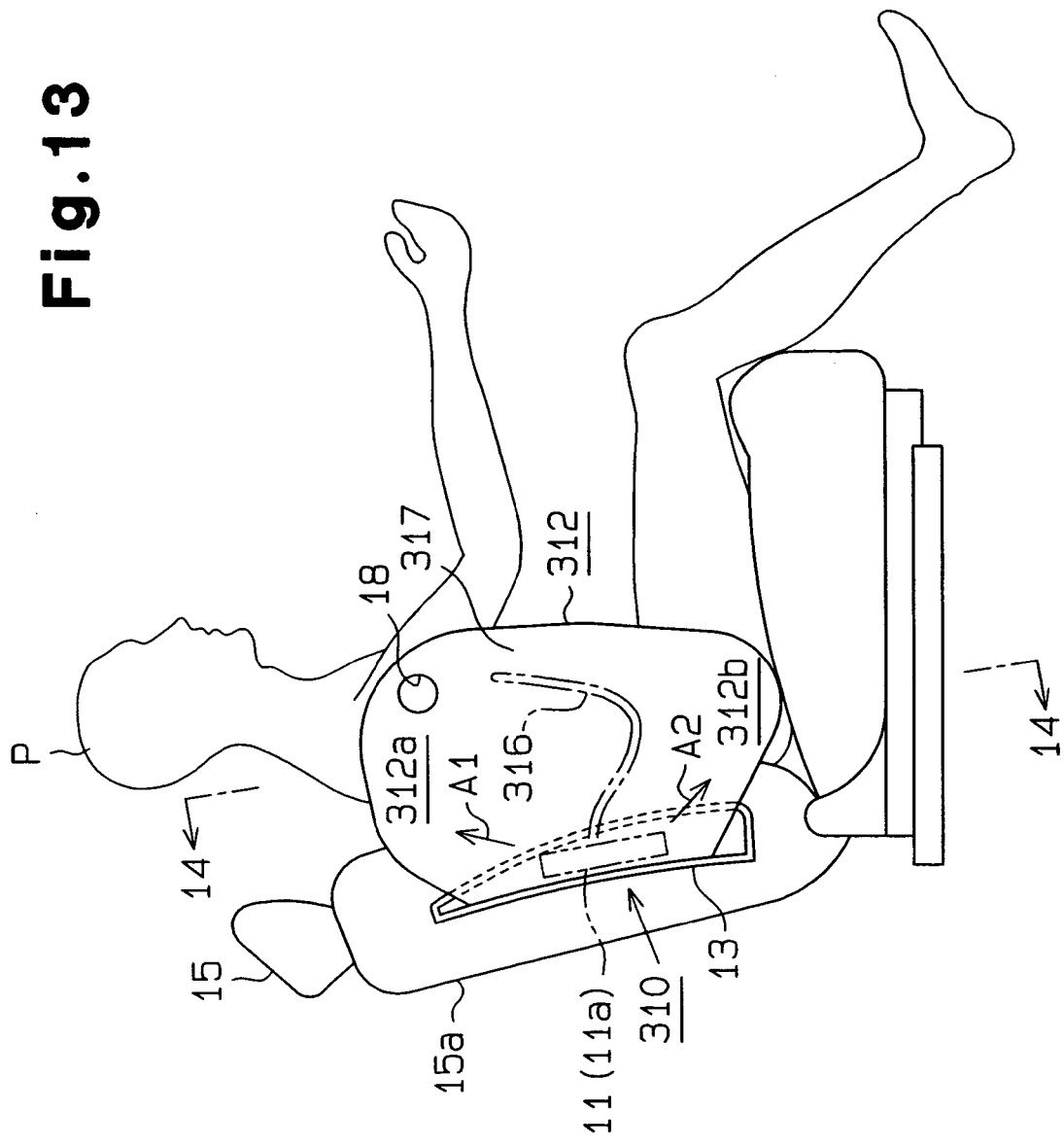
FIG. 13 is a schematic side view of an air bag device according to a third embodiment of the present invention that is installed in a seat.
Figure 14:
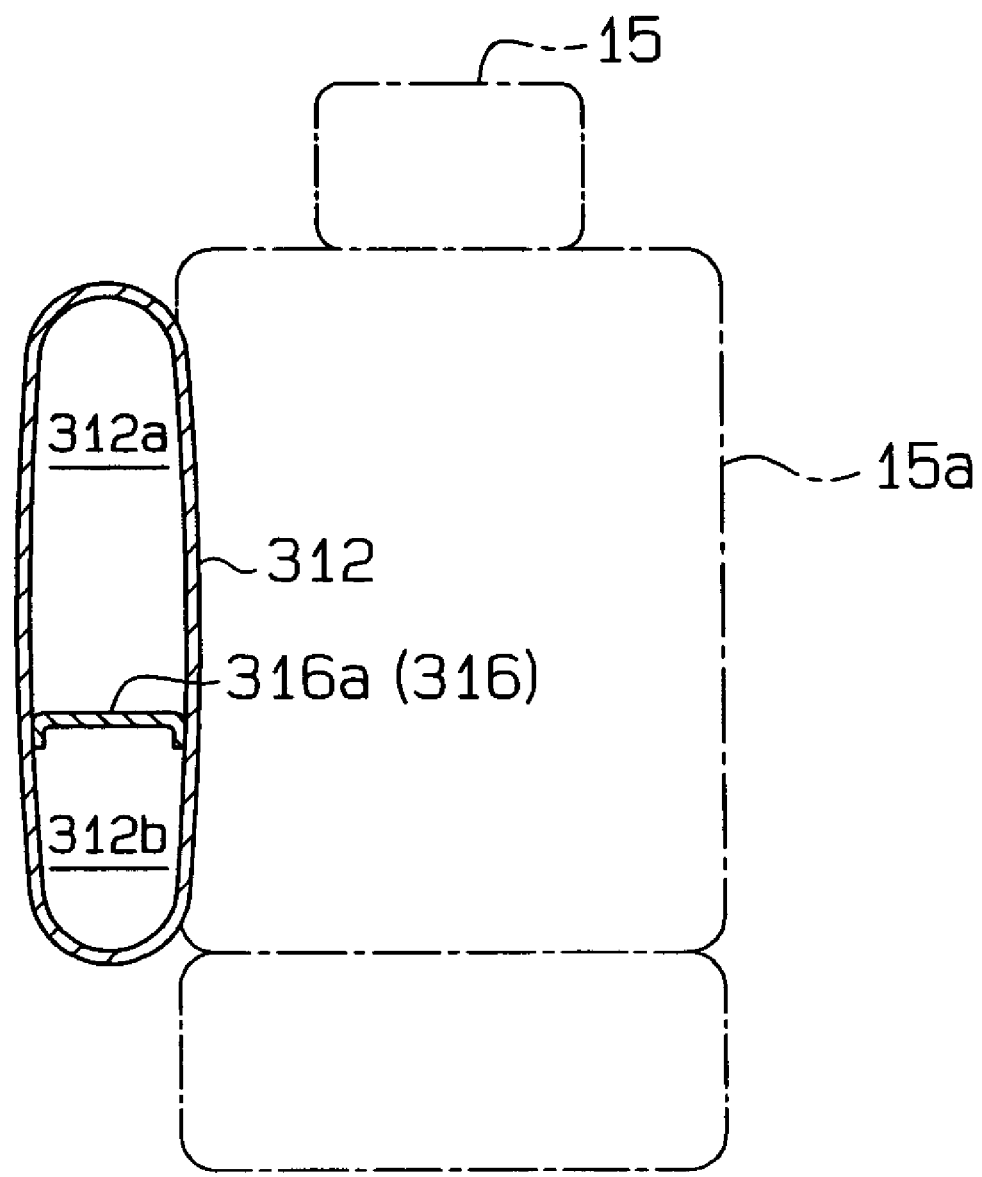
FIG. 14 is a cross sectional view of the air bag device taken along line 14—14 in FIG. 13.

An air bag device 310 according to a third embodiment of the present invention will now be described with reference to FIGS. 13 and 14. FIG. 13 is a side view schematically showing the air bag device 310 arranged on the seat, and FIG. 14 is a cross sectional view of the air bag device taken along line 2—2 in FIG. 13.

Referring to FIG. 13, an air bag 312 of the air bag device 310 in the third embodiment includes a connector 316 that defines an upper chamber 312a, which is inflated at a position corresponding to the thorax region of the passenger P, and a lower chamber 312b, which is inflated at a position corresponding to the lumbar region of the passenger P. The connector 316 is formed by a tether 316a, which connects part of two base fabrics that form the air bag 312 (see FIG. 14).

The tether 316a is made of the same material as that of the base fabrics, which form the air bag 312, arranged between the two base fabrics during inflation of the air bag 312, and generally U-shaped substantially at the middle of the side surface of the air bag 312. The tether 316a includes a first end connected to the case 11a of the inflator 11 and a second end spaced from a distal edge of the air bag 12 in the horizontal direction (the edge spaced from the backrest 15a of the seat 15) by a predetermined distance. A communication passage 317 is formed between the second end of the connector 316 and the distal edge of the air bag 312 as a communicating means for communicating the upper chamber 312a to the lower chamber 312b.

Some of the gas discharged from the inflator 11 is discharged in an upward direction (as indicated by arrow A1) toward the upper chamber 312a, and the remaining gas is discharged downward (as indicated by arrow A2) toward the lower chamber 312b. The gas is directly discharged into the upper chamber 312a and the lower chamber 312b such that the internal pressure of the upper chamber 312a becomes smaller than the internal pressure of the lower chamber 312b.

When, for example, there is an obstacle on the seat 15, the air bag 312 may be inflated in a state in which the obstacle gets caught in the air bag 312. Although the obstacle obstructs inflation of the lower chamber 312b of the air bag 312 and increases the pressure in the lower chamber 312b, the gas in the lower chamber 312b is released into the upper chamber 312a through the communication passage 317. This prevents the pressure of the lower chamber 312b from becoming greater than a predetermined value. As a result, the air bag 312 is inflated in a satisfactory manner and the air bag 12 applies less impact to the obstacle.

The air bag device 310 of the third embodiment has the following advantages.

(1) The pressure of the lower chamber 312b is prevented from being increased by an obstacle to maintain the inflation of the air bag 312 in a satisfactory state.

Figure 17:
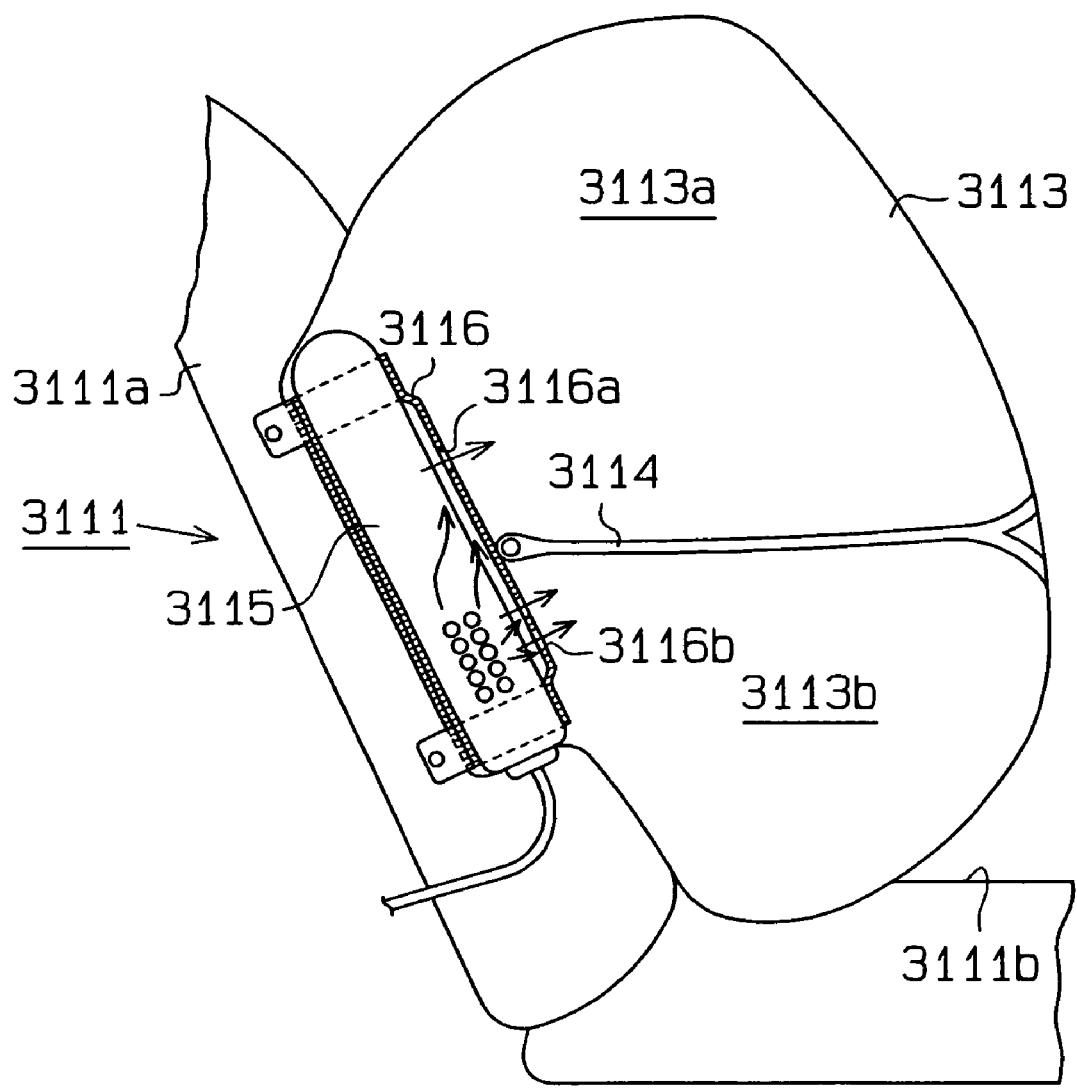
FIG. 17 is a schematic side view of a prior art air bag device.

A prior art air bag device described in Japanese Laid-Open Patent Publication No. 2000-177527 is embedded in a side portion of a backrest 3111a of a vehicle seat 3111, as shown in FIG. 17. An air bag 3113 is completely divided into an upper chamber 3113a and a lower chamber 3113b with a dividing seam 3114. An inflator 3115 has a housing 3116, which includes first flow openings 3116a communicated with the upper chamber 3113a and second flow openings 3116b communicated with the lower chamber 3113b. The sum of the opened areas of the first flow openings 3116a differs from the opened areas of the second flow openings 3116b. The difference between the opened areas changes the speed for charging gas into the upper chamber 3113a and the lower chamber 3113b and produces an internal pressure difference between the upper chamber 3113a and the lower chamber 3113b.

The air bag 3113 of the prior art air bag device is inflated to a seat surface 3111b of the seat 3111 to protect the lumbar region of the passenger. Accordingly, for example, when there is an obstacle on the seat surface 3111b of the seat 3111, the air bag 3113 may be inflated in a state in which the obstacle gets caught in the air bag 3113. In such a case, the obstacle reduces the volume of the lower chamber 3113b and increases the internal pressure of the lower chamber 3113b. Due to the increase in the internal pressure, the lower chamber 3113b presses the obstacle with a stronger force. The reaction force of the pressing displaces the lower chamber 3113b, or the inflation position of the entire air bag 3113. As a result, the inflation state of the air bag 3113 becomes unstable. The third embodiment solves such problems and maintains the inflation state of the air bag 312 in a satisfactory state.

(2) The air bag 312 is arranged in the backrest 15a of the seat 15. Therefore, the storage space for the air bag device 10 is utilized in a more flexible manner compared where the air bag 312 is arranged in a vehicle door. In addition, since there is relatively large space between the side of the backrest 15a and the sidewall of the vehicle body, the air bag 312 is inflated easily and more reliably.

(3) The communication passage 317 is arranged near the distal edge of the inflated air bag 312 (the position near the distal edge spaced from the backrest 15a of the seat 15). This communicates the upper chamber 312a with the lower chamber 312b at a position separated from the gas discharge nozzle of the inflator 11. Therefore, the gas in the lower chamber 312b is released into the upper chamber 312a after gas discharged from the inflator 11 reaches the communication passage 317 (i.e., after the lower chamber 312b is inflated appropriately). As a result, the lower chamber 312b is inflated quickly.

(4) The two base fabrics of the air bag 312 are connected by the tether 316a, which defines the upper chamber 312a and the lower chamber 312b in the air bag 312. Further, the tether 316a enables stable inflation of the air bag 312 while restricting the size of the air bag 312 to a predetermined value during inflation. In addition, the communication passage 317 is easily formed using the tether 316a.

(5) The connector 316 is generally U-shaped when seen from the side of the inflated air bag 312. This shape enables the gas to flow along the inner surface of the air bag 312. In addition, the device 10 has the communication passage 317 arranged at the downstream end of the gas flow. Therefore, gas is released smoothly into the upper chamber 312a from the lower chamber 312b through the communication passage 317.

The third embodiment may be modified as described below.

Although the inflator 11 is set to discharge gas in two directions toward the upper chamber 312a and the lower chamber 312b, the inflator 11 may be set to discharge gas in one direction or in three or more directions.

The inflator 11 may be embedded in a part other than the end of the backrest 15a of the seat 15.

Figure 15:
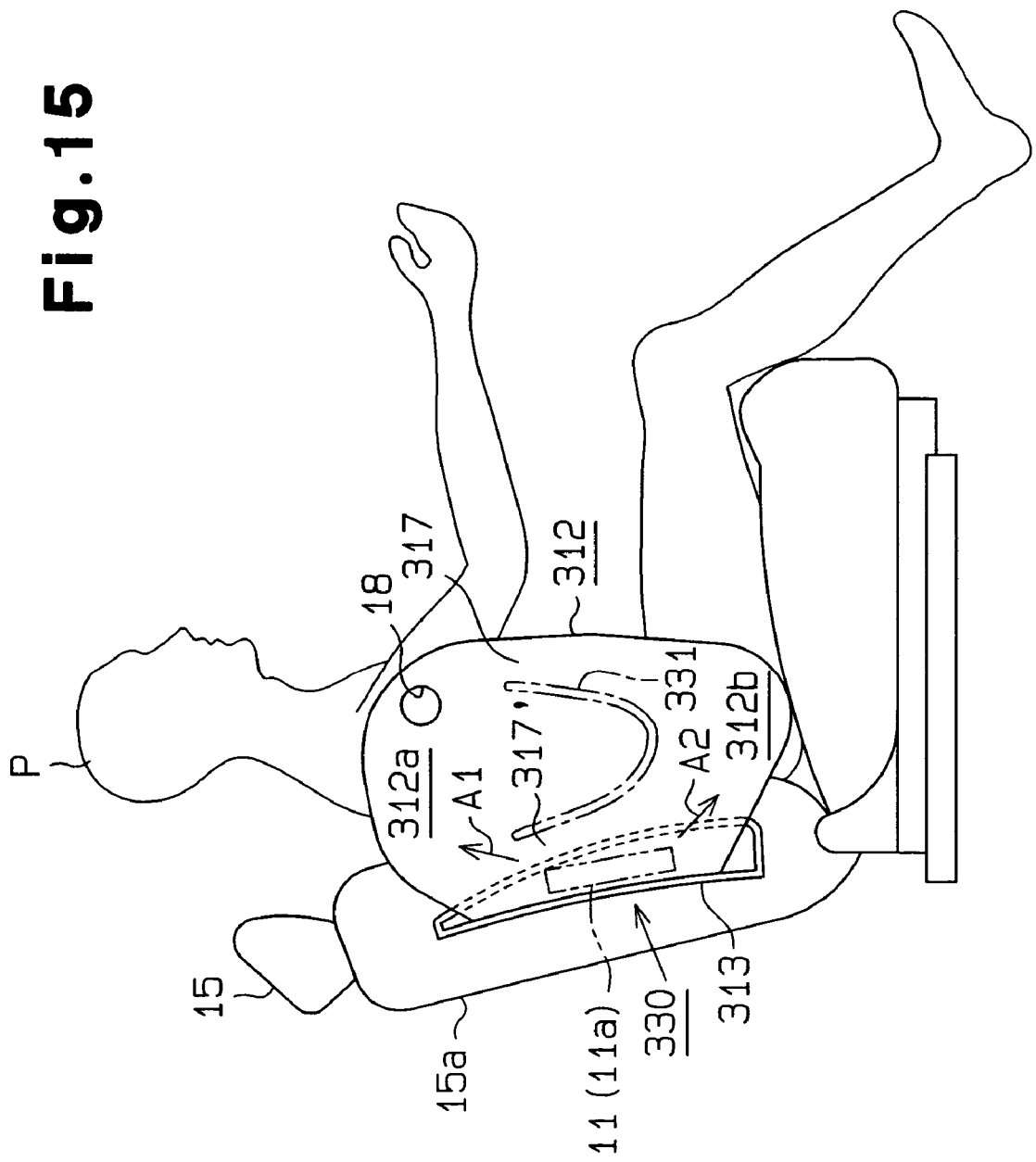
FIG. 15 is a schematic side view showing a first modification of the air bag device in FIG. 13.

Instead of connecting one end of the tether 316a to the case 11a of the inflator 11, the end may be spaced from the case 11a of the inflator 11. For example, in an air bag device 330 shown in FIG. 15, the tether 316a (or the connector 331) has an end spaced from the case 11a of the inflator 11 and a communication passage 317' newly formed between the case 11a and the end to communicate the upper chamber 312a with the lower chamber 312b.

Instead of being generally U-shaped, the connector 316 may be, for example, generally V-shaped, generally L-shaped, generally Z-shaped, generally waveformed, saw-tooth-like, generally square waveformed, or have a shape formed by combining the above shapes as required.

The communication passage 317 is formed at the distal end of the inflated air bag 312. However, the communication passage 317 may be formed at other locations.

The tether 316a may be omitted and the base fabrics may be sewn or bonded with each other.

Figure 16:
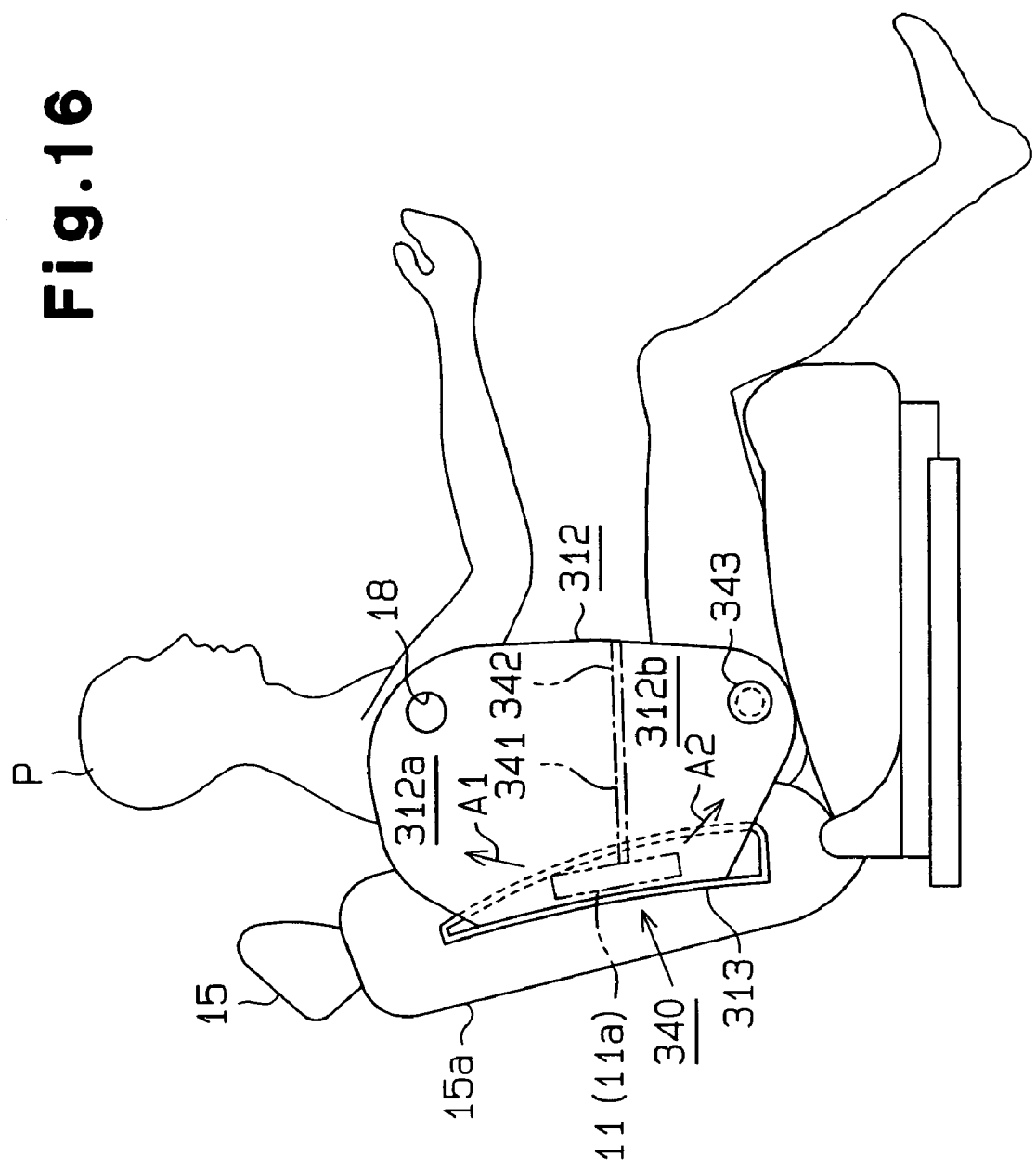
FIG. 16 is a side view schematically showing a second modification of the air bag device of FIG. 13.

Instead of forming the communication passage 317, a connector 341 may be formed to completely define the upper chamber 312a and the lower chamber 312b like, for example, in an air bag device 340 shown in FIG. 16. The connector 341 includes a separating portion 342, which serves as a communication means and is separated from the base fabric of the air bag 312 when the internal pressure of the lower chamber 312b exceeds a predetermined value.

In this structure, the upper chamber 312a and the lower chamber 312b come into communication with each other and to release the gas in the lower chamber 312b into the upper chamber 312a when the internal pressure of the lower chamber 312b exceeds a predetermined value. Therefore, when there is no obstacle on the seat, the internal pressure in the lower chamber 312b increases promptly to further increase the inflation speed of the air bag 312. In addition, when the internal pressure in the lower chamber 312b exceeds a predetermined value due to one reason or another, the separating portion 342 is separated from the base fabric of the air bag 312 and the gas in the lower chamber 312b is instantaneously released into the upper chamber 312a.

A variable vent hole 343 may be formed in the air bag 312 as a discharging means to externally discharge gas into the lower chamber 312b when the internal pressure in the lower chamber 312b exceeds a predetermined value. In this case, the variable vent hole 343 prevents the internal pressure of the lower chamber 312b from increasing excessively and displacing the inflation position of the air bag 312. Thus, the inflation of the air bag 312 is maintained in a satisfactory state. The variable vent hole 343 prevents an excessive increase in the internal pressure of the lower chamber 312b and reduces the impact applied to the obstacle on the seat when the air bag 312 is inflated.

The variable vent hole 343 is formed, for example, as described below. A communication hole is formed on the base fabric corresponding to the lower chamber 312b of the air bag 312. Then, the communication hole is sealed by a cover cloth. In this state, the cover cloth is sewn to the communication hole with a strength that causes the cover cloth to come off when the internal pressure in the lower chamber 312b exceeds a predetermined value.

The interior of the air bag 312 may be divided into three or more chambers. In this case, a communication means is arranged at least between two of the chambers and gas from the inflator 11 may be directly supplied to the at least two chambers, which are communicated with each other through the communication means. In this structure, when the internal pressure of any one of the at least two chambers increases excessively, gas is released from the chamber to the other one of the chambers through the communication means. In this manner, the inflation state of the air bag 312 is maintained in a satisfactory state.

Particularly, when one of the at least two chambers is arranged at the lowermost portion of the air bag 312 and the air bag 312 is inflated in a state in which there is an obstacle on the seat 15, the pressure of gas in the lowermost chamber increases quickly. In this state, some of the gas in the lowermost chamber is discharged to the other chamber promptly. This could prevent the obstacle from immediately affecting the inflation of the air bag 312.

An air bag device 414 according to a fourth embodiment of the present invention will now be described with reference to FIGS. 18 to 22.

Figure 18:
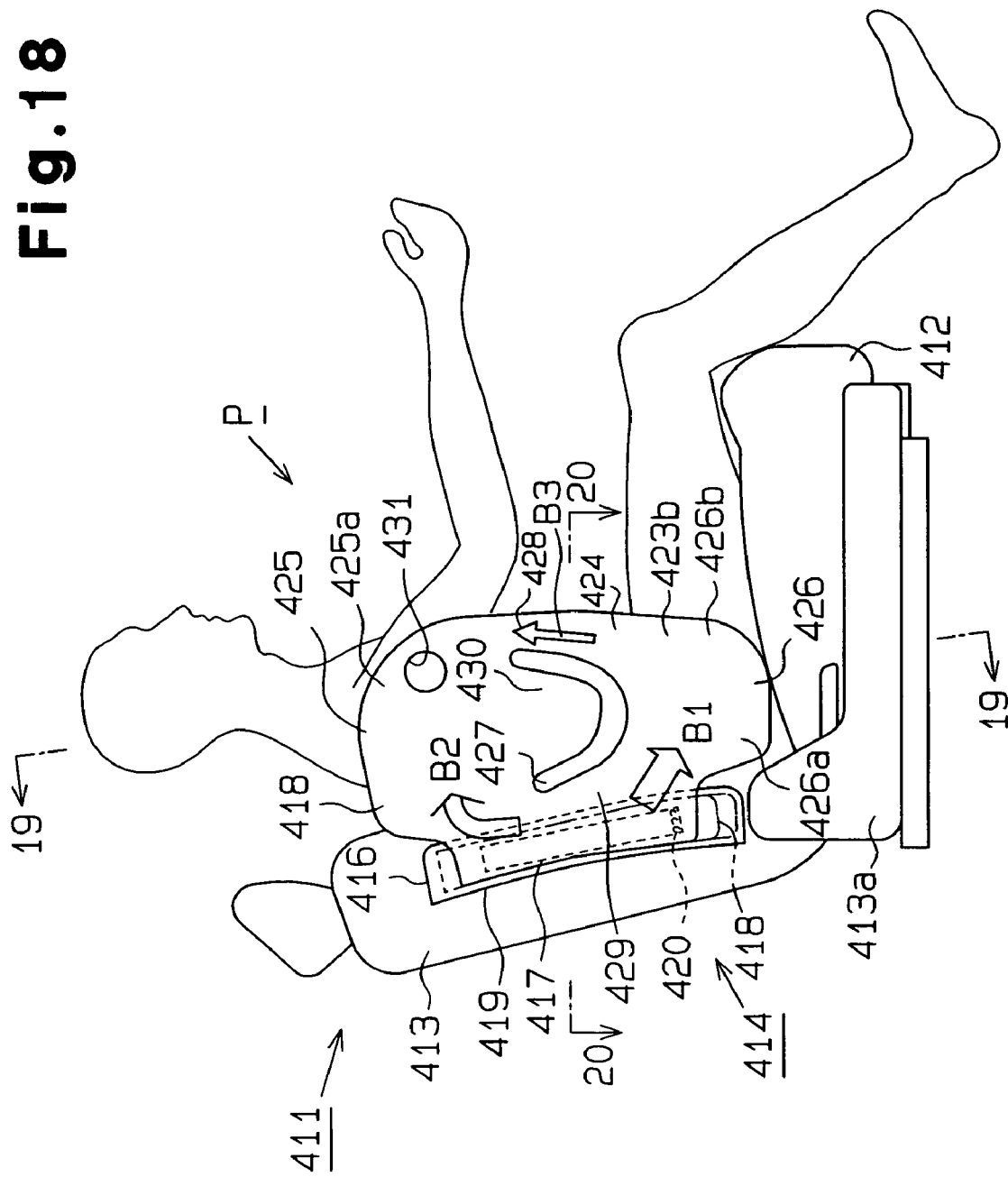
FIG. 18 is a schematic side view of an air bag device according to a fourth embodiment of the present invention.

As shown in FIG. 18, a right vehicle seat 411 includes a seat portion 412 and a backrest 413. An air bag device 414, which is stored in a cover 416, is arranged in the side of the backrest 413, which opposes a door 415 that is part of the sidewall of a vehicle body. A reclining cover 413a, which covers a reclining mechanism (not shown) for adjusting the angle of the backrest 413, is arranged at the lower portion of the backrest 413.

The air bag device 414 includes an inflator 417, which serves as a gas generator, and a bag-like air bag 418, which covers the inflator 417. A case 419 of the inflator 417 is fixed to a frame of the backrest 413 (not shown) by the cover 416. The case 419 of the inflator 417 is filled with gas to expand the air bag 418. A plurality of gas discharge nozzles 420 are formed in the lower portion of the case 419 to discharge gas.

The air bag 418 is formed to be bag-like by sewing two base fabrics 423a and 423b with each other, which are made of, for example, woven material that has undergone a fire resistance treatment. The air bag 418 is formed such that its side surface is generally rectangular when inflated, as indicated by solid line in FIG. 18. The air bag 418 is folded and stored in the case 419 when the air bag device 414 is inactive, as indicated by broken lines in FIG. 18.

The air bag 418 includes a main portion 424, which is located at the middle of the air bag, an upper inflation portion 425, which is inflated upward from the main portion 424, and a lower inflation portion 426, which is inflated downward from the main portion 424. The abdominal region of the passenger P sitting in the seat 411 corresponds to the main portion 424, the thorax region corresponds to the upper inflation portion 425, and the lumbar region corresponds to the lower inflation portion 426 when the air bag 418 is inflated.

Figure 19:
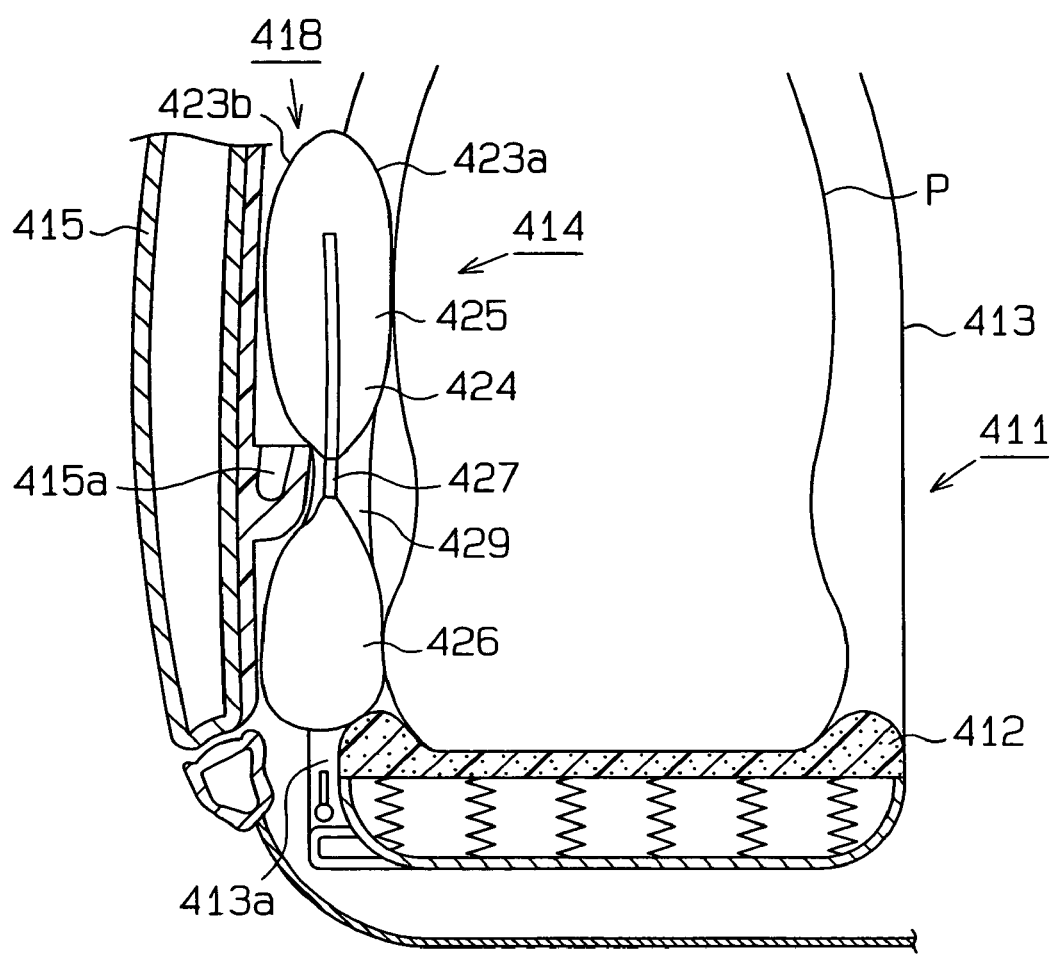
FIG. 19 is a cross sectional view of the air bag device taken along line 19—19 in FIG. 18.
Figure 20:
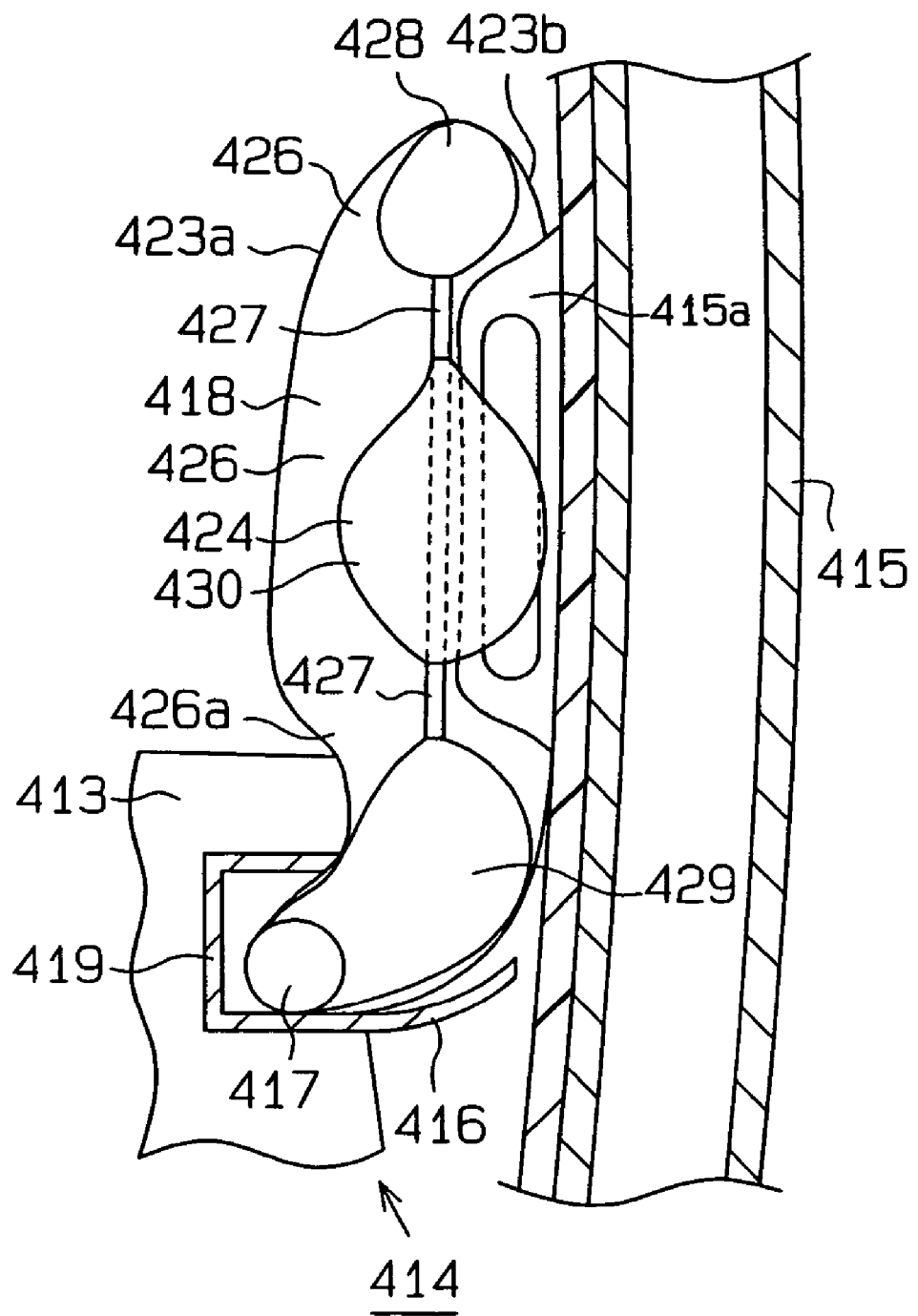
FIG. 20 is an enlarged cross sectional view of the air bag device taken along line 20—20 in FIG. 18.

Referring to FIGS. 18 to 20, a generally U-shaped connector 427 is arranged almost around the middle of the main portion 424 and at a position corresponding to an armrest 415a of the door 415. The connector 427 is formed by sewing the two opposing base fabrics 423a and 423b to each other. The connector 427 maintains part of the two base fabrics 423a and 423b in a connected state when the inflator 417 supplies gas to the inner side of the air bag 418.

The connector 427 includes a first end spaced from the distal edge of the air bag 418 and a second periphery spaced from the inflator 417. A front passage 428 for gas extends between the first end and the distal edge of the air bag 418, and a rear passage 429 for gas extends between the second end and the inflator 417. In the main portion 424 of the inflated air bag 418, a hollow portion 430 is defined above the connector 427. The connector 427 functions to prevent the inflated air bag from being contracted in the vertical direction and produce an internal pressure difference between an upper chamber and a lower chamber, which are defined by the connector 427 in the air bag 418. The upper chamber is formed by the upper inflation portion 425 and part of the main portion 424, and the lower chamber is formed by the lower inflation portion 426 and part of the remaining main portion 424.

In the upper inflation portion 425, a vent hole 431 is formed at the distal end 425a of the base fabric 423b, which opposes the door 415. The vent hole 431 discharges inflation gas in the air bag 418 by a predetermined amount.

A method of folding the air bag 418 will now be described with reference to FIGS. 21(a) to 21(d). In FIGS. 21(a) to 21(d), arrow A indicates the inflation direction of the air bag 418.

Referring to FIGS. 21(a) and 21(b), the upper inflation portion 425 is first folded into the main portion 424 along a folding line L1 (folding line of the boundary between the upper inflation portion 425 and the main portion 424), which extends in the inflation direction A. In this state, the upper inflation portion 425 is stored between the two base fabrics 423a and 423b of the main portion 424.

Subsequently, part of the lower inflation portion 426 (hereinafter, described as a proximal end portion) 426a is folded into the remaining lower inflation portion 426 (hereinafter, described as a distal end portion) 426b along a folding line L2 (folding line extending obliquely from the proximal end of the inflator 417 to the distal end of the lower inflation portion 426), which extends obliquely relative to the inflation direction A of the air bag 418. In this state, the proximal end portion 426a is stored between the two base fabrics 423a and 423b of the distal end portion 426b. An angle between the folding line L2 and the side of the backrest 413 of the seat 411 is set in accordance with the shape of a reclining cover 413a, which is arranged in the lower portion of the backrest 413.

Then, the distal end portion 426b, which stores the proximal end portion 426a, is folded back on the base fabric 423b of the main portion 424 along a folding line L3 in the inflation direction A of the air bag 418 (folding line of the boundary between the lower inflation portion 426 and the main portion 424), as shown in FIGS. 21(b) and 21(c). Thus, the folding length of the air bag 418 in the vertical direction is adjusted to conform to the length of the inflator 417. Then, the air bag 418 is folded in an accordion-like manner toward the inflator 417, as shown in FIG. 21(d).

In the above air bag device 414, a control circuit provides an operation signal to the inflator 417 when the sensor detects an impact that is greater than or equal to a predetermined value. In response to the operation signal, the inflator 417 is actuated to instantaneously discharge gas through the gas discharge nozzles 420 into the air bag 418 to start inflating the air bag 418.

When the air bag 418 is inflated, the air bag 418, which is folded in an accordion-like manner as shown in FIG. 21(d), is extended to be generally rectangular, as shown in FIG. 21(c). Then, the distal end portion 426b of the lower inflation portion 426 is rotated about the folding line L3, which serves as an axis, to be unfolded and extended, as shown in FIG. 21(b). Simultaneously, the upper inflation portion 425 is inflated upward from the inner side of the main portion 424, as shown in FIG. 21(a). Finally, the proximal end portion 426a of the lower inflation portion 426 is obliquely inflated downward out of the distal end portion 426b of the lower inflation portion 426. This unfolds the air bag 418.

Subsequently, inflation gas, which is supplied from the inflator 417 into the air bag 418, is divided into two flows by the connector 427. Some of the inflation gas flows to the lower inflation portion 426 along the connector 427 (indicated by arrow B1 in FIG. 18). The remaining inflation gas is guided to the rear passage 429 along the connector 427 (as indicated by arrow B2 in FIG. 18) and flows toward the upper inflation portion 425 and the hollow portion 430 of the main portion 424. Further, some of the inflation gas supplied to the lower inflation portion 426 flows toward the upper inflation portion 425 and the hollow portion 430 of the main portion 424 through the front passage 428 (as indicated by arrow B3 in FIG. 18).

The rear passage 429 and the front passage 428 are throttling passages, the cross-sectional areas of which are reduced from the inlets (lower ends) to the outlets (upper ends), respectively. Therefore, the amount of inflation gas that flows to the upper inflation portion 425 and the hollow portion 430 of the main portion 424, is less than the amount of inflation gas that flows to the lower inflation portion 426. Accordingly, the internal pressure of the lower inflation portion 426 is greater than the internal pressure of the upper inflation portion 425 and the hollow portion 430 of the main portion 424. That is, the connector 427 produces the internal pressure difference in the air bag 418.

The inflation gas, which reaches the upper inflation portion 425, is discharged out of the air bag 418 through the vent hole 431 by a predetermined amount. The discharging prevents the pressure in the air bag 418 from exceeding a predetermined value. In addition, by gradually discharging the inflation gas, the hardness of the air bag 418 is adjusted such that the air bag 418 supports the passenger P as it slows the passenger. This completes the inflation of the air bag 418.

Accordingly, the air bag device 414 of the fourth embodiment has the following advantages.

(1) When the air bag 418 is in a folded state, the proximal end portion 426a in the lower inflation portion 426 of the air bag 418 is folded along the folding line L2, which extends obliquely with respect to the inflation direction A of the air bag 418, and stored in the distal end portion 426b of the lower inflation portion 426.

This prevents the proximal end portion 426a of the lower inflation portion 426 from being inflated earlier than the distal end portion 426b. This inflation prevents the proximal end portion 426a from hitting the reclining cover 413a, which is arranged at the lower portion of the seat 411, when the air bag 418 is inflated. As a result, vibration of the air bag 418 is prevented during inflation, and stable inflation of the air bag 418 is ensured.

In a prior art air bag device, an air bag 4101 includes a body 4102, an upper inflation portion 4103, and a lower inflation portion 4104, as shown in FIG. 23(a). The upper inflation portion 4103 and the lower inflation portion 4104 are each folded and stored in the body 4102, as shown in FIG. 23(b). Then, the air bag 4101 is folded in an accordion-like manner toward a proximal end portion 4105. In the above folding method, the proximal end portion 4105 of the lower inflation portion 4104 may impact a reclining cover when the lower inflation portion 4104 is inflated during an initial inflation stage of the air bag 4101. Such an impact causes the air bag 4101, which is in the middle of the inflation, to vibrate and destabilizes the inflation state of the air bag 4101. In addition, when, for example, there is an obstacle on the seat near the reclining cover, this would further destabilize the inflation state of the air bag 4101.

(2) The angle between the folding line L2 of the proximal end portion 426a and the side of the backrest 413 of the seat 411 is set in accordance with the shape of the reclining cover 413a. This prevents the proximal end portion 426a from hitting the reclining cover 413a in a more reliable manner.

(3) In the air bag 418 that is folded, the main portion 424 is first inflated, and then the distal end portion 426b of the lower inflation portion 426 starts inflation. The distal end portion 426b is unfolded by rotating about the folding line L3, which serves as an axis, and then inflates.

For example, when there is an obstacle 432 on the seat 411 in the inflation direction A of the air bag 418, the distal end portion 426b of the lower inflation portion 426 contacts the obstacle in an initial inflation stage, as shown in FIG. 22(a). When the distal end portion 426b is rotated about the folding line L3, which serves as an axis, the entire air bag 418 moves upward and away from the obstacle, as shown in FIG. 22(b). This enables smooth inflation of the air bag 418 even when there is an obstacle on the seat 411. In addition, since the proximal end portion 426a is inflated subsequent to the inflation of the distal end portion 426b, the lower inflation portion 426, which has a high internal pressure, does not contact the obstacle. Accordingly, the air bag 418 applies less impact to the obstacle on the seat when the air bag 418 is inflated.

(4) The folding length of the air bag 418 corresponds to that of the inflator 417. Therefore, the size of the air bag device 414 may be reduced in accordance with the size of the inflator 417, and the air bag device 414 is stored in the seat 411 more efficiently.

(5) The main portion 424 of the air bag 418 includes the connector 427, which is generally U-shaped and formed by connecting part of the two base fabrics 423a and 423b. Further, the connector 427 is foldable together with the base fabrics 423 and 423b. Therefore, the air bag 418 including the connector 427 is folded compactly.

MODIFIED EXAMPLES

The fourth embodiment may be modified, as described below.

The upper inflation portion 425 of the air bag 418 may be omitted. In this case, it is desirable that a vent hole 431 be arranged, for example, at a distal end portion of the main portion 424.

When the backrest 413 of the seat 411 has enough accommodation space, at least one of the folding of the upper inflation portion 425 and the folding of the distal end portion 426b of the lower inflation portion 426 may be omitted.

The case 419 may be omitted and the air bag device 414 may be mounted on the backrest 413 of the seat 411.

The air bag 418 may be formed by sewing a sheet of fabric in a bag-like manner.

The connector 427 of the air bag 418 may be formed by bonding or fusing, or using a fastener instead of sewing the base fabrics. Further, the connector 27 may be formed by arranging a base fabric between the two base fabrics 423a and 423b.

The connector 427 of the air bag 418 may be omitted. Further, the connector 427 may be generally V-shaped, generally W-shaped, generally reversed U-shaped, generally reversed V-shaped, generally reversed W-shaped, generally reversed U-shaped, generally horizontally U-shaped, generally horizontally V-shaped, or generally horizontally W-shaped.

The front and rear passages 428 and 429 are formed to become gradually narrower from the lower end to the upper end. However, the front and rear passages 428 and 429 may each have a cross-sectional area, which gradually becomes smaller in a stepped manner or which is constant.

The air bag 418 may be formed of, for example, nonwoven fabrics or synthetic resin films instead of woven fabrics.

The inflator 417 may be arranged outside the air bag 418 to guide inflation gas generated in the inflator 417 to the inner side of the air bag 418.

A side air bag device 514 according to a fifth embodiment of the present invention will now be described with reference to drawings.

Figure 26:
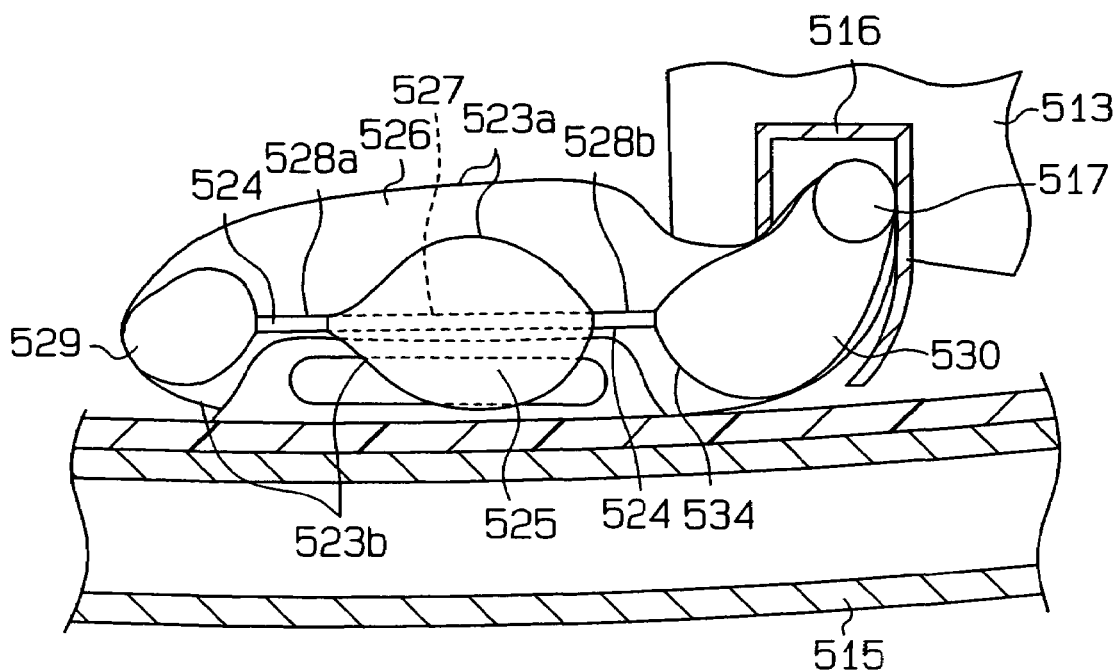
FIG. 26 is a cross sectional view taken along line 26—26 in FIG. 24.

FIG. 24 shows a seat 511 when seen from a vehicle door side. The seat 511 includes a seat portion 512 and a backrest 513. Referring to FIGS. 24 and 26, the side air bag device 514 is embedded in a side surface of the backrest 513.

The side air bag device 514 includes an inflator 517 for generating inflation gas and an air bag 518, which is attached to and covers the inflator 517. The inflator 517 has a case 519, which is fixed to a frame (not shown) of the backrest 513 by means of a cover 516. The case 519 is filled with inflation gas for inflating the air bag 518. A plurality of gas discharge nozzles 520 are formed on the lower portion of the case 519 to discharge inflation gas.

The sensor (not shown) for detecting an impact applied to the sidewall of the body is connected to the inflator 517. The control circuit (not shown) transmits the operation signal to the side air bag device 514 when the sensor detects an impact that is greater than or equal to a predetermined value. In response to the operation signal, the inflator 517 discharges inflation gas to the air bag 518.

The air bag 518 is formed by sewing two base fabrics (a passenger side base fabric 523a and a door side base fabric 523b), such as woven materials that have undergone a fire resistance treatment, to each other. The air bag 518 is inflated as indicated by a solid line in FIG. 24. The side air bag 518 is folded and stored in the case 519 when the air bag device 514 is inactive, as indicated by the broken line in FIG. 24.

Figure 25:
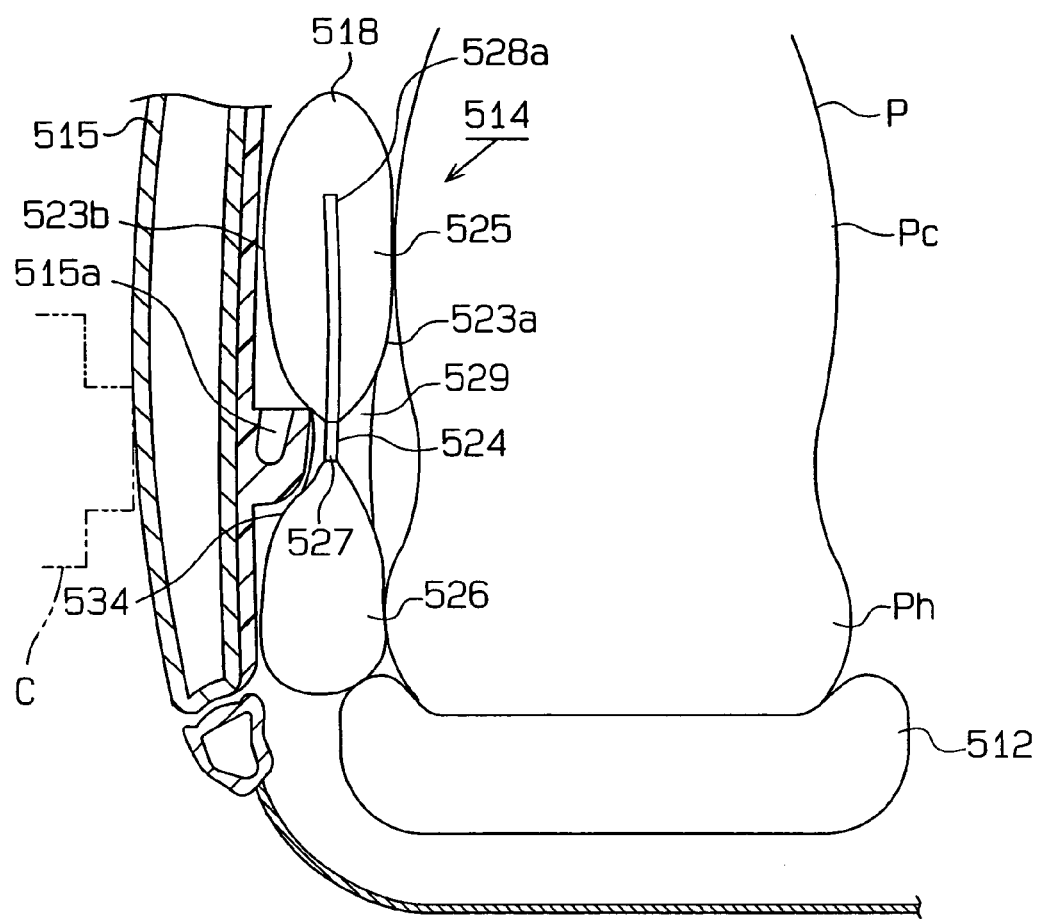
FIG. 25 is a cross sectional view taken along line 25—25 in FIG. 24.

Referring to FIGS. 24 to 26, a generally U-shaped connector 524 is arranged in proximity to the middle of the air bag 518. The connector 524 functions as part of a defining means, a control means, a contraction suppressing means, and a pressure difference setting means. The connector 524 is formed by sewing the passenger side base fabric 523*a* and the door side base fabric 523*b* to each other. Accordingly, the base fabrics 523*a* and 523*b* are not separated from each other at the connector 524 when the inflator 517 supplies gas into the air bag 518.

The connector 524 defines an upper chamber 525 and a lower chamber 526 in the air bag 518. When the air bag 518 is inflated, the upper chamber 525 is located adjacent to the thorax region Pc of the passenger P who is sitting in the seat 511, and the lower chamber 526 is located adjacent to the lumbar region Ph of the passenger P.

The connector 524 includes a horizontal portion 527, or a horizontal restriction, which extends almost horizontally in frontward and rearward directions when the air bag 518 is inflated, and vertical restrictions, or a front vertical portion 528*a* and a rear vertical portion 528*b*, which extend toward the upper end of the air bag 518 from both ends of the horizontal portion 527. The horizontal portion 527 is arranged at a position above the gas discharge nozzles 520 of the inflator 517. In other words, the inflator 517 is fixed to the seat 511 such that the gas discharge nozzles 520 are arranged at a position lower than the horizontal portion 527. The horizontal portion 527 defines the upper chamber 525 and the lower chamber 526 in the air bag 518.

A front passage 529 is arranged between the front vertical portion 528*a* and the font inner surface of the air bag 518. A rear passage 530 is arranged between the rear vertical portion 528*b* and the rear inner surface of the air bag 518. The upper chamber 525 and the lower chamber 526 are in communication with each other though the front passage 529 and the rear passage 530. The front vertical portion 528*a* and the rear vertical portion 528*b* function as a passage defining means, which define the front passage 529 and the rear passage 530, respectively.

The front and rear passages 529 and 530 have opening cross-sectional areas that gradually narrow from the lower end to the upper end. Accordingly, the front and rear passages 529 and 530 are so-called throttling passages. The front passage 529 and the rear passage 530 function as a communication means, a pressure difference setting means, and part of an impact reducing means.

A discharging means, or a front side vent hole 531 is arranged on the upper portion of the door side fabric 523*b*. It is preferred that the front vent hole 531 be located at a farthermost position from the gas discharge nozzles 520 and be formed at a position lying along an extension of the front passage 529.

In the upper portion of the door side base fabric 523*b*, a variable discharging means, or a variable vent mechanism 532 is formed at a position above the rear vertical portion 528*b*. It is preferred that the variable vent mechanism 532 be located along an extension of the rear passage 530. The variable vent mechanism 532 is formed of a rear side vent hole 531 and a cover cloth 533, which is sewn to cover the rear side vent hole 531. The cover cloth 533 is sewn to the door side base fabric 523*b* with a strength, which causes the cover cloth 533 to be separated when pressure in the upper chamber 525 exceeds a predetermined value.

Referring to FIG. 26, when the air bag 518 is inflated, the horizontal portion 527 is located at substantially the same height as that of an armrest 515*a* extending inward from the door 515. In other words, the upper chamber 525 is located above the armrest 515*a* and the lower chamber 526 is located below the armrest 515*a* when the air bag 518 is inflated. The armrest 515*a* is covered by a hollow portion 534, which is defined by the upper chamber 525, the lower chamber 526, and both passages 529 and 530.

The operation of the side air bag device 514 will now be described.

The control circuit provides the operation signal to the inflator 517 when the sensor detects an impact that is greater than or equal to a predetermined value. In response to the operation signal, the inflator 517 instantaneously discharges inflation gas, which is filled in the case 519, into the air bag 518 through the gas discharge nozzles 520 to inflate the air bag 518.

In the air bag 518, the horizontal portion 527 and the rear vertical portion 528*b* divide the flow of inflation gas into two. One of the inflation gas flows is directed toward the lower chamber 526 along the horizontal portion 257, as indicated by arrow A1 in FIG. 24. The other one of the inflation gas flows is directed toward the upper chamber 525 along the rear vertical portion 528*b*, as indicated by arrow A2. As indicated by arrow A3, some of the gas supplied to the lower chamber 526 flows to the upper chamber 525 along the front vertical portion 528*a*. A predetermined amount of the gas, which reaches the upper chamber 525., gradually flows out of the air bag 518 through the vent hole 531.

Figure 27:
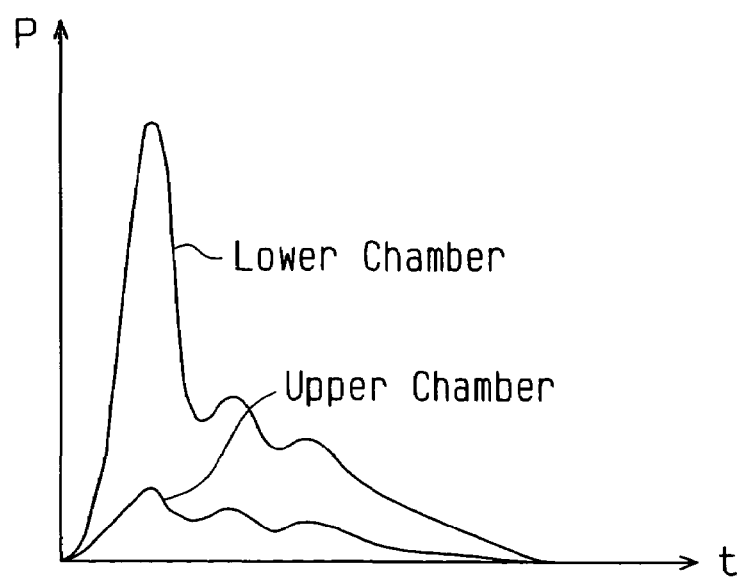
FIG. 27 is a graph showing pressure change in an upper chamber and a lower chamber in FIG. 24 during inflation.

Since the rear passage 530 and the front passage 529 are throttling passages, the amount of gas flowing to the upper chamber 525 is less than the amount of gas flowing to the lower chamber 526, and the internal pressure of the lower chamber 526 is relatively high while the internal pressure of the upper chamber 525 is relatively low. That is, an internal pressure difference between the upper chamber and the lower chambers 525 and 526 is produced. The pressure in the upper chamber 525 and the lower chamber 526 changes as shown by the graph of FIG. 27. The graph shows that the internal pressure difference continues for a predetermined period of time.

Referring to FIG. 25, when a vehicle C collides with the door 515, the impact deforms the lower portion of the door 515 and compresses the lower chamber 526. In this case, although the internal pressure of the lower chamber 526 dramatically increases, the gas in the lower chamber 526 flows to the upper chamber 525 through the two passages 529 and 530. This prevents the pressure in the lower chamber 526 from increasing excessively. When the pressure in the upper chamber 525 increases and exceeds a predetermined pressure, the vent hole 531 of the variable vent mechanism 532 is opened and part of the gas in the upper chamber 525 is externally discharged. This prevents the internal pressure in the upper chamber 525 from increasing excessively.

The side air bag device 514 of the fifth embodiment has the following advantages.

(1) The connector 524 defines the upper chamber 525 and the lower chamber 526 in the air bag 518 and forms the front passage 529 and the rear passage 530, which communicates the upper chamber 525 with the lower chamber 526. Further, the connector 524 controls the gas flow direction such that the gas from the inflator 517 is supplied to the upper chamber 525 and the lower chamber 526 substantially simultaneously. Thus, the upper chamber 525 and the lower chamber 526 are inflated without delay to each other. The upper chamber 525 and the lower chamber 526 are in communication with each other through the passages 529 and 530. Therefore, when a foreign object compresses any one of the chambers 525 and 526, gas is released into the other one of the chambers 525 and 526 through the two passages 529 and 530. Thus, the air bag 518 effectively absorbs the impact irrespective of where the impact is applied. As a result, the impact applied to the passenger is reduced.

Figure 28:
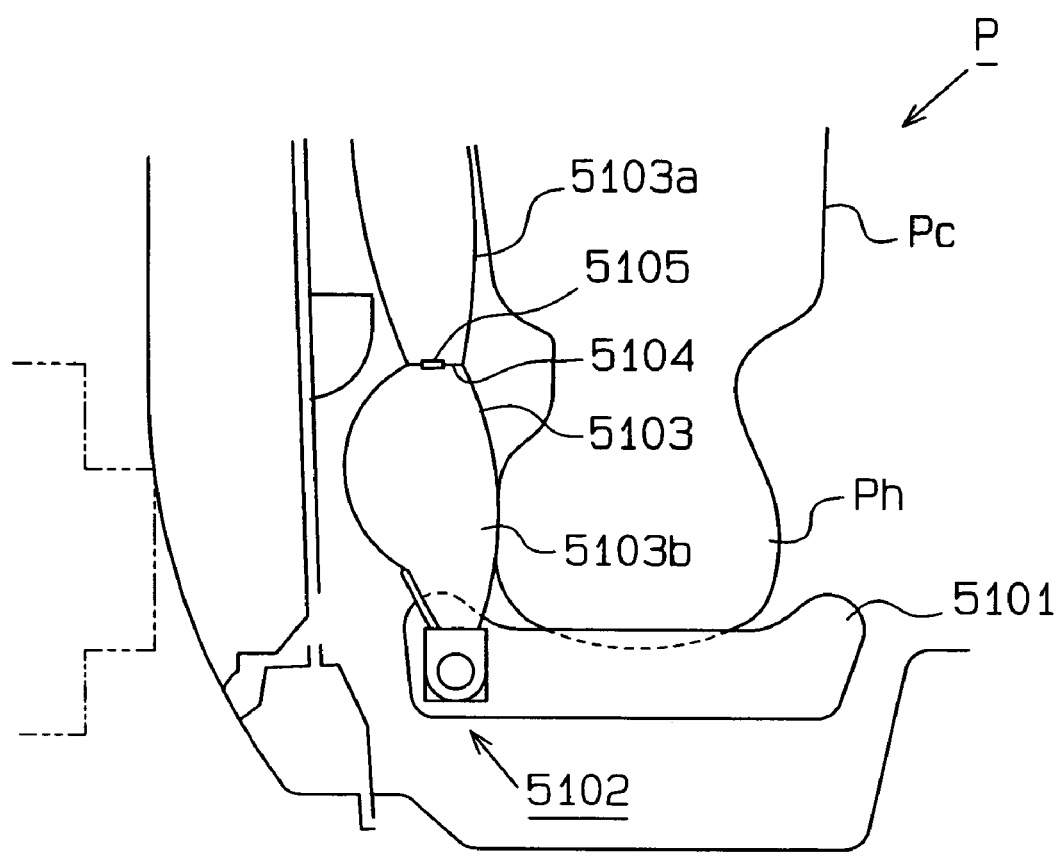
FIG. 28 is a schematic view of a first prior art side air bag device.

FIG. 28 is a first prior art example of a side air bag device 5102 disclosed in Japanese Laid-Open Patent Publication No. 10-67297. The side air bag device 5102 is arranged on a side of a seat cushion 5101. An air bag 5103 is divided into an upper air bag 5103a and a lower air bag 5103b by a partition 5104. The lower air bag 5103b is adjacent to the lumbar region Ph of the passenger P when the air bag 5103 is inflated. A pressure adjustment valve 5105 is attached to the partition 5104. The partition 5104 and the pressure adjustment valve 5105 inflate the lower air bag 5103b before the upper air bag 5103a. In the first prior art example, inflation gas from the inflator is always supplied to the upper air bag 5103a through the lower air bag 5103b. Therefore, the upper air bag 5103a is inflated subsequent to the inflation of the lower air bag 5103b.

The number of off-road vehicles and minivans having a bumper at a relatively high position has increased recently. When such a vehicle collides into the side of another vehicle, the impact is applied to the side door of that other vehicle at a relatively high position and the portion, to which the impact is applied, is first deformed. Therefore, the impact may not be absorbed sufficiently if the inflation of the upper air bag 5103a is delayed. Since the upper chamber 525 and the lower chamber 526 are inflated without delay in the fifth embodiment, the air bag 518 effectively absorbs the impact irrespective of where the impact is applied.

In a second prior art example of a side air bag device disclosed in Japanese Laid-open Patent Publication No. 2000-177527, the upper chamber 3113a is inflated almost simultaneously with the lower chamber 3113b, as shown in FIG. 28. Accordingly, it is possible to absorb the impact, which is applied to the side door at a relatively high position. However, when a relatively strong impact is applied to the lower portion of the side door, the lower portion of the side door is deformed and moved into the lower chamber 3113b. Since the lower chamber 3113b has a relatively high internal pressure and is separated from the upper chamber 3113a, the gas in the lower chamber 3113b is trapped and the internal pressure in the lower chamber increases excessively when the side door compresses the lower chamber 3113b. As a result, the applied impact may not be sufficiently absorbed.

Further, the shape of the seat, the seating posture of a passenger, and the inner shape of the side door differ between vehicles. It is required to change the size of the openings 3116a and 3116b to optimize the internal pressure difference between the chambers 3113a and 3113b in accordance with the type of vehicle. Accordingly, in addition to the air bag 3113, the housing 3116 must be prepared in accordance with the type of vehicle. This increases the manufacturing cost.

In addition, since the dividing seam 3114 is horizontal and linear, the air bag 3113 is susceptible to contraction in the vertical direction when the air bag 3113 is inflated. This may destabilize the shape of the air bag 3113 and produce differences in the impact absorbing performance of the air bag 3113.

In the fifth embodiment, inflation gas is supplied to the upper chamber 525 and the lower chamber 526 almost simultaneously by the connector 524, which is easily formed. Therefore, special extra parts are not required and the side air bag device 514 is manufactured at a low cost.

(2) The air bag 518 includes the connector 524, which is formed of the horizontal portion 527 extending in a substantially horizontal direction and the front and rear vertical portions 528a and 528b extending in the upward direction from the horizontal portion 527. Therefore, the rear vertical portion 528b and the horizontal portion 527 distribute the gas supplied from the inflator 517 to the upper chamber 525 and the lower chamber 526, respectively. In addition, the horizontal portion 527 and the two vertical portions 528a and 528b smoothly guide the flow of the inflation gas to the upper chamber 525 and the lower chamber 526. In this manner, the gas in the air bag 518 flows in a stable manner.

The U-shaped connector 524 collects gas in the portion that is surrounded by the horizontal portion 527 and the two vertical portions 528a and 528b. This prevents unintentional changes in the internal pressure of the upper chamber 525 when the air bag 518 is inflated.

(3) The front and rear vertical portions 528a and 528b prevent the inflated air bag 518 from being contracted in the vertical direction. Therefore, the shape of the inflated air bag 518 is stabilized and thus the air bag 518 effectively absorbs the impact.

(4) The connector 524 defines the front and rear passages 529 and 530, which produce a predetermined pressure difference between the upper chamber 525 and the lower chamber 526. Accordingly, the internal pressure difference between the upper chamber 525 and the lower chamber 526 may be set to a desired value in accordance with the shape of the connector 524.

(5) The generally desirable characteristics of the side air bag 518 are the lower chamber 526, which protects the lumbar region Ph of the passenger P, having a relatively strong constraining capability, and the upper chamber 525, which protects the thorax region Pc of the passenger P, having a constraining capability that is slightly weaker than that of the lower chamber 526. The side air bag device 514 is set such that the internal pressure of the lower chamber 526 is greater than the internal pressure of the upper chamber 525 when the inflation of the air bag 518 is completed. Accordingly, the side air bag 518 has desirable characteristics.

(6) In the upper chamber 525, the front vent hole 531 is located farthermost from the gas discharge nozzles 520 of the inflator 517. Since the location of the front vent hole 531 is optimized, the entire air bag 518 is inflated in a more reliable manner.

(7) When the lower chamber 526 is, for example, compressed by a foreign object, the internal pressure in the lower chamber 526 increases excessively. In this event, the gas in the lower chamber 526 may flow into the upper chamber 525 through the front and rear passages 529 and 530 to dramatically increase the internal pressure in the upper chamber 525. When the pressure in the upper chamber 525 exceeds a predetermined value, the gas in the upper chamber 525 is externally discharged through the variable vent mechanism 532. This prevents the internal pressure in the upper chamber 525 from increasing excessively.

(8) The connector 524 functions as the defining means for defining the upper chamber 525 and the lower chamber 526, the pressure difference setting means for setting the pressure difference between the upper chamber 525 and the lower chamber 526, the control means for controlling the flowing direction of gas in the air bag 518, and the contraction suppressing means for suppressing the contraction of the inflated air bag 518. Therefore, the air bag 518 is very simple.

(9) The air bag 518 is formed from the passenger side base fabric 523a and the door side base fabric 523b. The connector 524 is formed by sewing part of the two base fabrics 523a and 523b to each other. The connector 524, which has a plurality of functions, is formed through a relatively simple process, such as sewing both base fabrics 523a and 523b to each other. Accordingly, the air bag 518 is easily manufactured.

(10) The front and rear passages 529 and 530 are formed from the base fabrics 523a, 523b and the vertical portions 528a, 528b. Since the opening at the lower end of each of the front and rear passages 529 and 530 has a cross-sectional area that is larger than that of the upper end, the internal pressure difference between the upper chamber 525 and the lower chamber 526 is maintained for a relatively long time.

(11) The connector 524 is generally U-shaped. Thus, the front and rear passages 529 and 530, which are throttling passages communicating the upper chamber 525 to the lower chamber 526, are formed by a simple structure.

(12) The gas discharge nozzles 520 of the inflator 517 are arranged at a position lower than the horizontal portion 527. This structure is particularly preferable to increase the internal pressure of the lower chamber 526 in comparison with the upper chamber 525.

(13) The armrest 515a formed on the door 515 is arranged in the hollow portion 534 of the inflated air bag 518. Therefore, since the armrest 515a hardly interferes with the air bag 518, the frontward inflation of the air bag 518 and the flow of gas from the upper chamber 525 to the lower chamber 526 are not interfered with. Particularly, this prevents the delay of frontward inflation of the air bag 518 and an excessive increase in the internal pressure of the lower chamber 526 when the door 515 enters the air bag 518.

The side air bag device 514 of the fifth embodiment may be modified as described below.

The air bag 518 is formed by sewing the passenger side base fabric 523a and the door side base fabric 523b to each other. However, the air bag 518 may be formed, for example, by sewing a sheet of fabric in a bag-like manner.

The connector 524 of the air bag 518 is formed by sewing the passenger side base fabric 523a and the door side base fabric 523b to each other. However, the connector 524 may be formed by connecting the passenger side base fabric 523a and the door side base fabric 523b, for example, by bonding or fusing or by using a fastener.

Instead of being U-shaped, the connector 524 may be formed to have, for example, a deformed U-shape, a V-shape, a W-shape, an L-shape, a reversed U-shape, a reversed deformed U-shape, a reversed V-shape, a reversed W-shape, a reversed L-shape, a horizontal U-shape, a horizontally deformed U-shape, a horizontal V-shape, a horizontal W-shape, or a horizontal L-shape.

The air bag 518 is divided into the upper chamber 525 and the lower chamber 526 by the connector 524. However, the air bag 518 may be divided into, for example, three or more chambers in the vertical direction.

The openings of the front and rear passages 529 and 530 have cross-sectional areas, which gradually become narrower from the lower end to the upper end. However, the cross-sectional areas of the openings may become smaller in a stepped manner or may not change.

The vent hole 531 or the variable vent mechanism 532 may be omitted. A plurality of vent holes 531 or a plurality of variable vent mechanisms 532 may be employed.

Instead of the variable vent mechanism 532 having the cover cloth 533, a sewn portion may be arranged such that the passenger side base fabric 523a is released from the door side base fabric 523b when the pressure in the upper chamber 525 exceeds a predetermined value.

Another connector may be arranged in the air bag 518 near the gas discharge nozzle 520 to restrict the flow direction of the inflation gas.

A means for controlling the contraction of the air bag 518 in a vertical direction may be formed separately from the connector 524. That is, the passenger side base fabric 523a and the door side base fabric 523b may be, for example, connected with each other by a tether to prevent the upper chamber 525 and the lower chamber 526 from being inflated to a size that is greater than or equal to a predetermined value. This restricts contraction of the air bag 518 in the vertical direction.

The air bag 518 may be formed of, for example, a nonwoven fabric or a synthetic resin film.

A side air bag device 614 according to a sixth embodiment of the present invention will now be described with reference to drawings. The same reference numerals are used for elements identical to those in the fifth embodiment and will not be described. In the sixth embodiment, the variable vent mechanism 532 is omitted.

Figure 29:
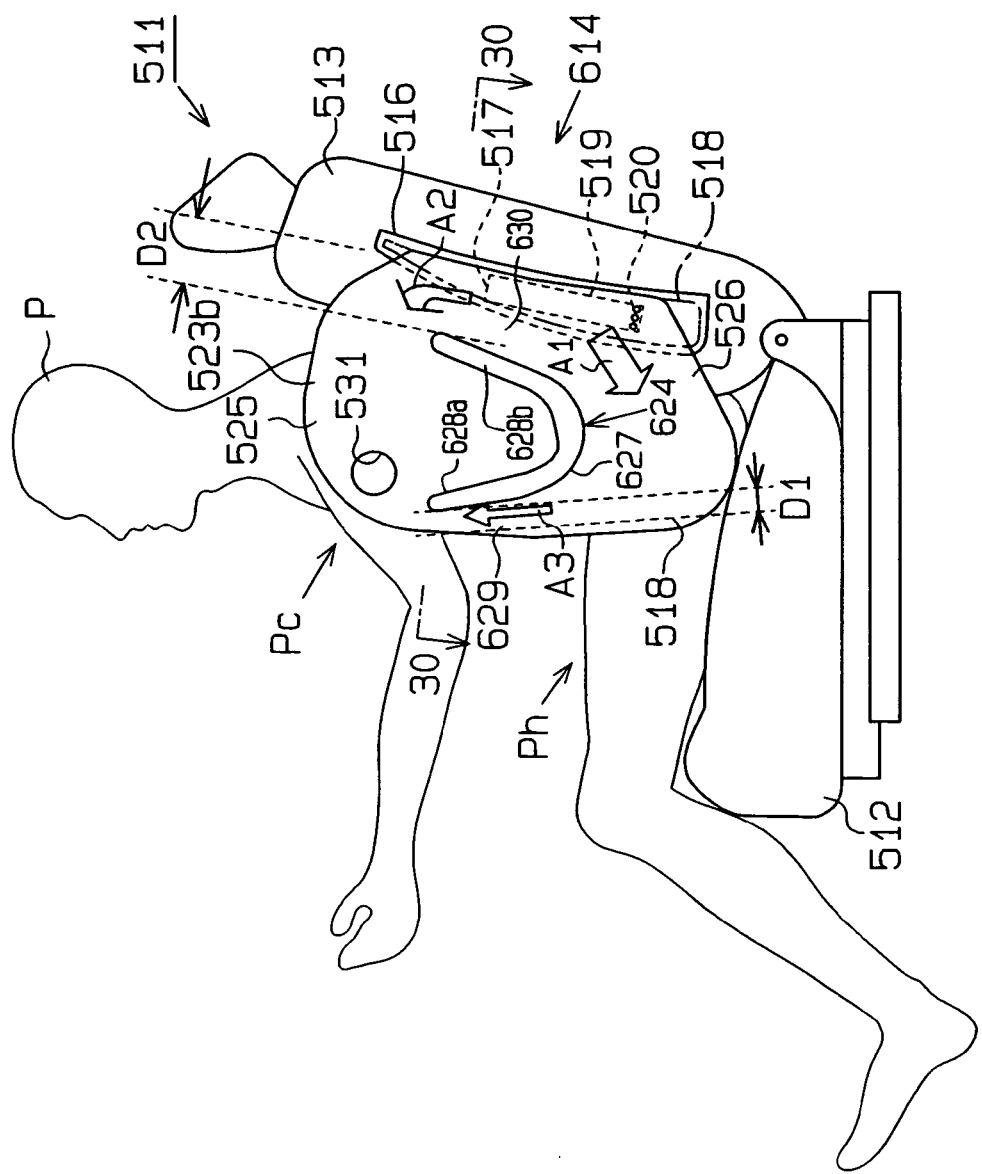
FIG. 29 is a schematic side view of the side air bag device according to a sixth embodiment of the present invention.
Figure 30:
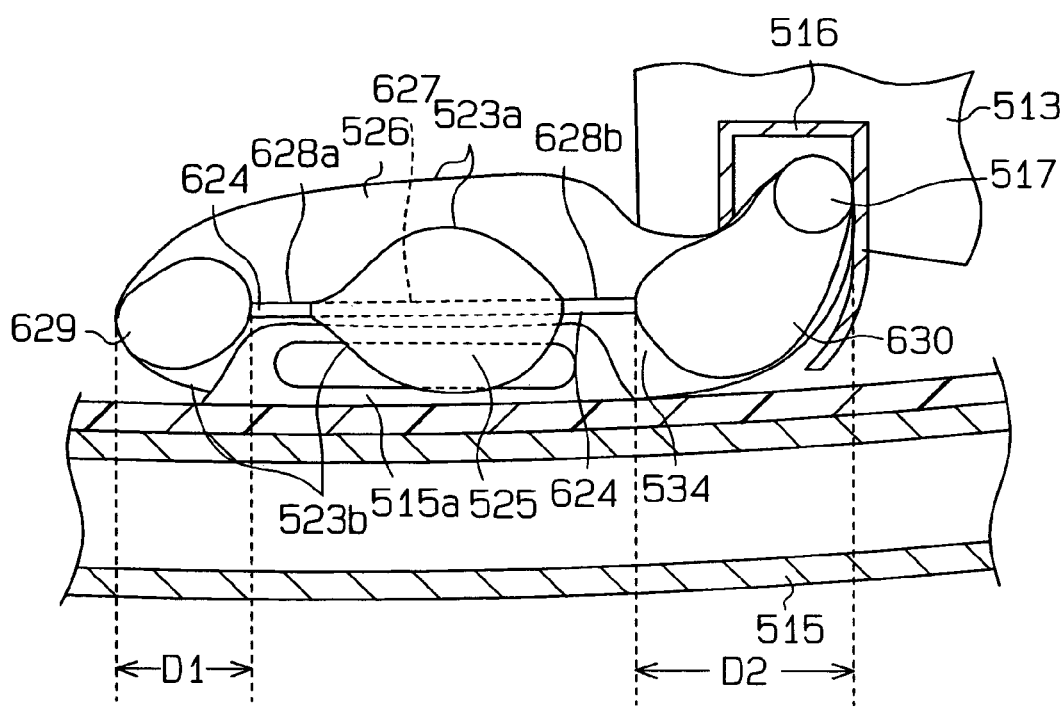
FIG. 30 is a cross sectional view of the side air bag device taken along line 30—30 in FIG. 29.

Referring to FIGS. 29 and 30, a side air bag device 614 of the sixth embodiment has a connector 624, which includes a horizontal portion 627, and a front vertical portion 628a and a rear vertical portion 628b, which extend to the upper end of an air bag 518 from both ends of the horizontal portion 627. A front passage 629 is arranged between the front vertical portion 628a and the front inner surface of the air bag 518, and a rear passage 630 is arranged between the rear vertical portion 628b and the rear inner surface of the air bag 518.

In the sixth embodiment, the front passage 629 has an upper portion (narrowest portion), the width D1 of which is smaller than the width D2 of an upper portion (narrowest portion) of the rear passage 630, when the air bag 518 is inflated (D1<D2). Further, the sum of the widths D1 and D2 is constant (D1+D2= constant). Since D1+D2=constant is satisfied, the amount of gas supplied to the upper chamber 525 through the front and rear passages 629 and 630 is constant. However, since D1<D2 is satisfied, the amount of gas passing through the front passage 629 is less than the amount of gas passing through the rear passage 630. By adjusting the amount of supply gas in this manner, the front of the air bag 518 near the front passage 629 in the upper chamber 525 is prevented from being inflated instantaneously. Therefore, when the air bag 518 is inflated in a state where the passenger P is laying his or her arm on an armrest 515a, the possibility of the arm being pushed up by instantaneous inflation of the front of the air bag 518 is reduced.

It is preferred that the width D1 of the front passage 629 be about 55 mm (the cross sectional area of the front passage 629 being about 1000 mm$^2$) and the width D2 of the rear passage 630 be about 85 mm (the cross sectional area of the rear passage 630 being about 2300 mm$^2$). The widths D1 and D2 are not limited to the above dimensions and may be set to other dimensions as long as the aforementioned requirements (D1<D2, D1+D2=constant) are satisfied.

The operation of the side air bag device 614 will now be described.

When the detection of an impact by the sensor starts inflation of the air bag 518, the flow of inflation gas is divided into two in the air bag 518 by the horizontal portion 627 and the rear vertical portion 628b. One of the inflation gas flows is directed toward the lower chamber 526 along the horizontal portion 627 as indicated by arrow A1. The other one of the inflation gas flows is directed to the upper chamber 525 along the rear vertical portion 628b as indicated by arrow A2. Some of the gas supplied to the lower chamber 526 flows toward the upper chamber 525 along the front vertical portion 628a as indicated by arrow A3.

Since the rear passage 630 and the front passage 629 are throttling passages, the amount of gas flowing to the upper chamber 525 is less than the amount of gas flowing to the lower chamber 526. Further, since the width D1 of the front passage 629 is smaller than the width D2 of the rear passage 630, the amount of gas passing through the front passage 629 is less than the amount of gas passing through the rear passage 630. This prevents the front of the air bag 518 near the front passage 629 from being inflated instantaneously.

The side air bag device 614 according to the sixth embodiment has the following advantages.

The width D1 of the front passage 629 is smaller than the width D2 of the rear passage 630. Therefore, the amount of gas passing through the front passage 629 is less than the amount of gas passing through the rear passage 630. This prevents the front portion of the air bag 518 near the front passage 629 from being inflated instantaneously. As a result, when the air bag 518 is inflated in a state in which the passenger P is laying his or her arm on the armrest 515a, the possibility of the arm being pushed up by the instantaneous inflation of the front portion of the air bag 518 is reduced.

The side air bag device 614 according to the sixth embodiment may be modified, as described below.

Instead of being U-shaped, the connector 624 may be formed to have, for example, a deformed U-shape, a V-shape, a W-shape, an L-shape, a reversed U-shape, a reversed a deformed U-shape, a reversed V-shape, a reversed W-shape, a reversed L-shape, a horizontal U-shape, a horizontally deformed U-shape, a horizontal V-shape, a horizontal W-shape, or a horizontal L-shape. In each shape, it is preferred that the width D1 of the front passage and the width D2 of the rear passage be set to a value of the shortest distance in the width direction of each passage.

The vent hole 531 may be omitted. In addition, a variable vent mechanism may be added. A plurality of vent holes 531 or a plurality of variable vent mechanisms may be employed.

A vehicle seat 711 according to a seventh embodiment of the present invention will now be described with reference to drawings.

Figure 31:
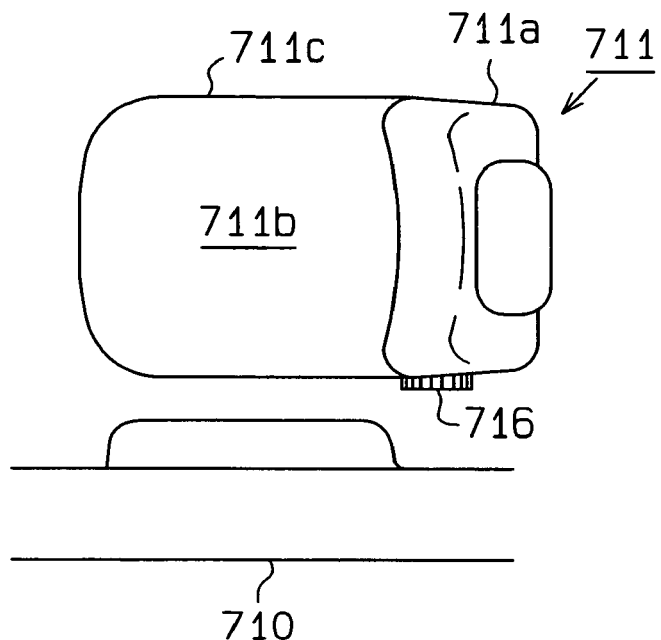
FIG. 31 is a plan view of a vehicle seat according to a seventh embodiment of the present invention.
Figure 32:
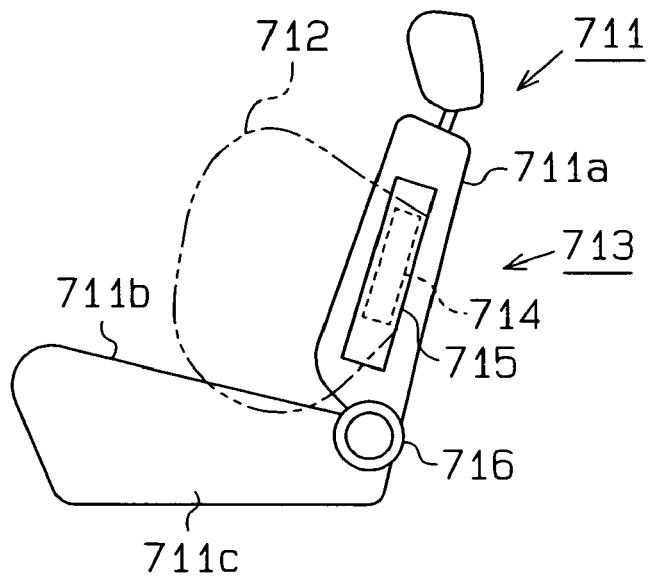
FIG. 32 is a side view showing the seat of FIG. 31.

FIG. 31 shows a plan view of the seat 711 and FIG. 32 shows a side view of the seat 711.

Referring to FIGS. 31 and 32, the seat 711 includes an air bag device 713, which has a side air bag 712 that is inflated between a vehicle body 710 and a passenger sitting in the seat 711 when an impact greater than or equal to a predetermined value is applied to the vehicle body 710.

The air bag device 713 includes an inflator 714, which generates gas, the air bag 712, which contains the inflator 714, and a case 715, which stores the inflator 714 and the air bag 712. The case 715 is attached to a frame (not shown) of a backrest 711a of the seat 711 and embedded in the end portion adjacent to the body 710 of the backrest 711a.

When the air bag 712 is inflated, the lower end of the air bag 712 is located at a position lower than a seat surface 711b of the seat 711. The shape of the air bag 712 when inflated corresponds to the normal seating posture of the passenger (i.e., the posture in which the backrest 711a is not reclined rearward).

A reclining seat is used as the seat 711. An adjuster 716 is arranged on a side surface of the seat 711 adjacent to the body 710 to adjust the angle of the backrest 711a. The adjuster 716 is attached to a connecting portion, which connects a sitting portion 711c to the backrest 711a. In addition, the adjuster 716 is a rotatable knob and connected to a known reclining mechanism arranged in the seat 711. When the adjuster 716 is rotated, the angle of the backrest 711a is adjusted in accordance with the rotated amount.

In the seventh embodiment, the backrest 711a and the sitting portion 711c do not have hollow portions at the side where the air bag device 713 is located. More specifically, the backrest 711a and the sitting portion 711c both do not have a hollow portion near the connecting portion that connects the backrest 711a to the sitting portion 711c. In other words, the backrest 711a and the sitting portion 711c each have a flat surface near the inflation range of the air bag 713 on the side in which the air bag 713 is installed. That is, although the adjuster 716 is arranged on the seat 711, the backrest 711a and the sitting portion 711c do not have hollow portions for the adjuster 716.

Since the sitting portion 711c does not have a hollow portion, if there is an obstacle on the seat 711, the obstacle would not be pushed into a hollow portion by the inflation of the air bag 712. This prevents an obstacle from getting caught between the air bag 712 and the seat 711 when the air bag 712 is inflated.

The vehicle seat 711 according to the seventh embodiment has the following advantages, as described below.

(1) Since the seat 711 does not have a hollow portion, even if there is an obstacle in the inflation range of the air bag 712, the obstacle would not get caught between the air bag 712 and the seat 711. This reduces the impact produced by the inflation of the air bag 712 and applied to the obstacle. Further, this prevents the inflation performance of the air bag 712 from being affected by the arrangement of the adjuster 716, while guaranteeing the function of the adjuster 716 for adjusting the angle of the backrest 711a.

Figure 35:
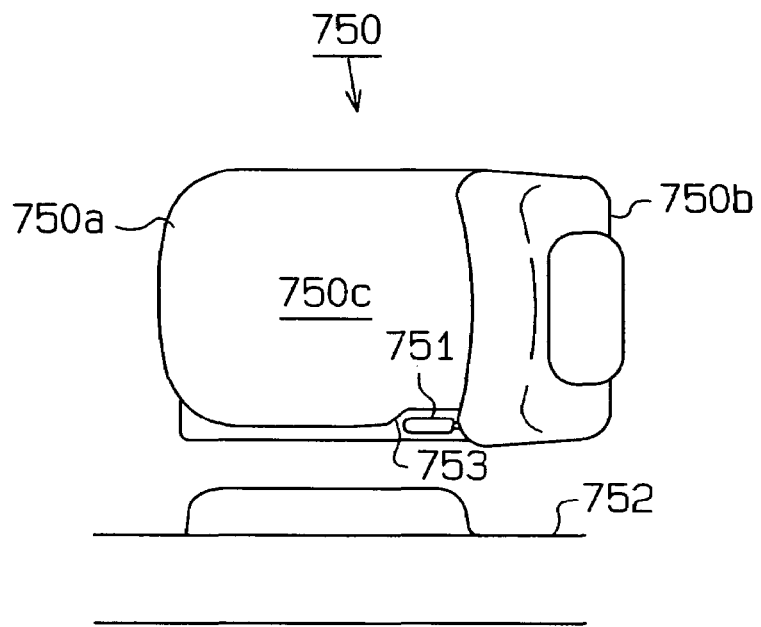
FIG. 35 is a plan view showing a prior art vehicle seat.
Figure 36:
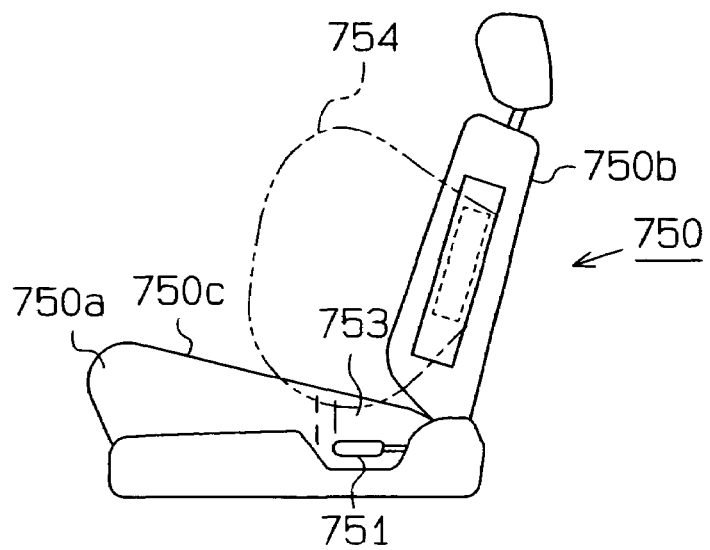
FIG. 36 is a side view showing the seat of FIG. 35.

FIGS. 35 and 36 show a prior art reclining seat 750 that enables the angle of a backrest 750b of the seat to be adjusted in multiple steps. The reclining seat 750 includes an adjustment lever 751, which is used for adjusting the angle of the backrest 750b. A hollow portion 753 is formed close to the backrest 750b on a side surface of the sitting portion 750a, which is adjacent to a body 752, and the adjustment lever 751 is arranged in the hollow portion 753.

A side air bag 754 is inflated to the vicinity of the seat surface 750c of the seat 750 or to a position lower than the seat surface 750c. Thus, when the air bag 754 is inflated when there is an obstacle on the sitting portion 750a, the air bag 754 may push against the obstacle in the hollow portion 753. When the obstacle is pushed against in the hollow portion 753, the air bag 754 is prevented from being inflated smoothly. This may reduce the effect of protecting the passenger. The seventh embodiment solves the foregoing problems in the prior art and prevents the inflation performance of the air bag 712 from falling.

(2) The adjuster 716 is a disk-like rotatable knob. Therefore, the air bag 712 is inflated along the peripheral surface of the adjuster 716 even if the air bag 712 contacts the adjuster 716 during inflation. Accordingly, the adjuster 716 does not interfere with the inflation of the air bag 712.

The seventh embodiment may be modified, as described below.

The air bag 712 is inflated to a position lower than the seat surface 711b of the seat 711. Instead of this, the air bag 712 may be inflated to the seat surface 711b of the seat 711 or may be inflated to a position above the seat surface 711b.

A hollow portion may be formed in parts that do not oppose the air bag 712 when the air bag 712 is inflated. The parts opposing the air bag 712 include portions of the seat 711 in the inflation range of the air bag 712 and the vicinity of the inflation range. For example, a hollow portion may be formed in the front portion of a side surface of the sitting portion 711c, which is adjacent to the body 710, a side surface of the backrest 711a, which is adjacent to the body 710, or side surfaces of the sitting portion 711c and the backrest 711a, which are opposite to the side surfaces that are adjacent to the body 710.

Figure 33:
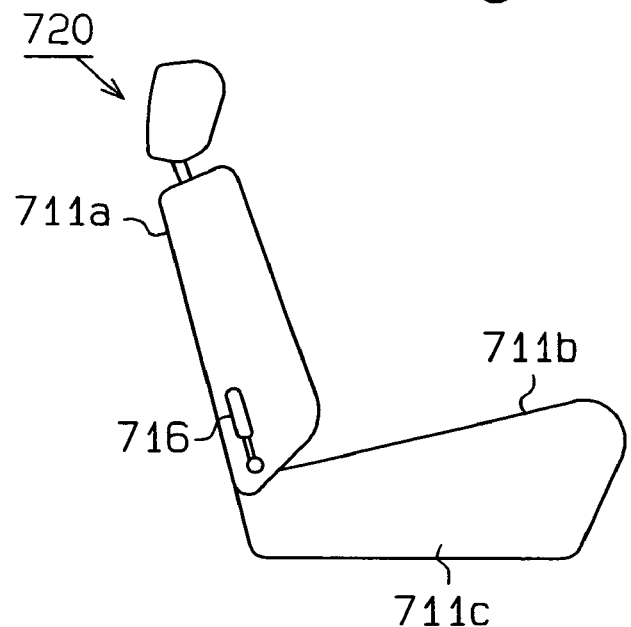
FIG. 33 is a side view showing a seat in a first modification.

The adjuster 716 may be installed in, for example, the backrest 711a of the seat 730 instead of in the connecting portion, which connects the sitting portion 711c to the backrest 711a, as shown in FIG. 33. In this case, a hollow portion may be provided in the backrest 711a to arrange the adjuster 716 in the hollow portion. However, since the hollow portion is not formed in the inflation range of the air bag 712, the obstacle does not get caught between the sitting portion 711c of the seat 720 and the air bag 712.

Figure 34:
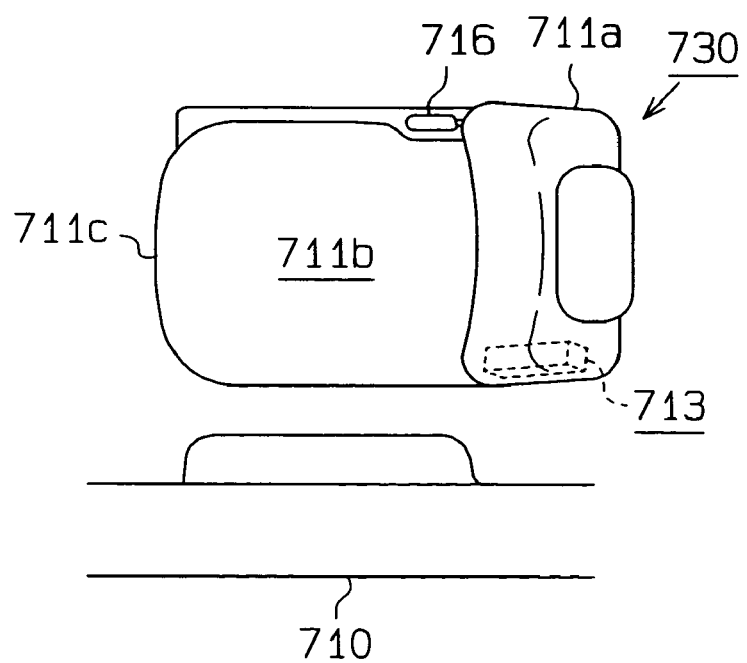
FIG. 34 is a plan view showing a seat in a second modification.

Further, the adjuster 716 may be, for example, arranged on a side surface of the backrest 711a of the seat 730, which is opposite to the side surface, in which the air bag device 713 is arranged, as shown in FIG. 34.

In addition, the adjuster 716 may be arranged in the front portion of the side surface of the sitting portion 711c, which is adjacent to the body 710.

The present invention may be applied to a vehicle seat, which includes an adjustment member for adjusting the vertical position of the seat, the horizontal position of the seat, or the inclination of the sitting portion 711c.

What is claimed is:

1. An air bag device installed in a backrest of a seat for passenger safety, the air bag device comprising:
   a gas discharging means arranged in the backrest for discharging gas;
   an air bag connected to the gas discharging means and including an upper chamber and a lower chamber, each being inflated by discharging gas to form a single chamber, wherein the air bag includes a first defining means for defining two chambers comprising the upper chamber and the lower chamber;
   an impact reducing means for reducing impact applied to a passenger when the air bag contacts the passenger in the seat during inflation of the air bag, wherein the gas discharging means is an inflator for discharging gas toward the lower chamber, and the impact reducing means is arranged in the air bag and includes a communication means for communicating the upper chamber to the lower chamber, wherein the communication means includes a first communication means arranged in a rear portion of the air bag near the backrest.

2. The air bag device according to claim 1, including a second communication means arranged in a front portion of the air bag and separated from the backrest.

3. The air bag device according to claim 2, wherein the first and the second communication means have first and second gas communication passages, respectively, and the second gas communication passage has a width that is less than a width of the first gas communication passage.

4. An air bag device installed in a backrest of a seat for passenger safety, the air bag device comprising:
   a gas discharging means arranged in the backrest for discharging gas;
   an air bag connected to the gas discharging means and including an upper chamber and a lower chamber, each being inflated by discharging gas to form a single chamber, wherein the air bag includes a first defining means for defining two chambers comprising the upper chamber and the lower chamber;
   an impact reducing means for reducing impact applied to a passenger when the air bag contacts the passenger in the seat during inflation of the air bag, wherein the gas discharging means is an inflator for discharging gas toward the lower chamber, and the impact reducing means is arranged in the air bag and includes a communication means for communicating the upper chamber to the lower chamber, wherein the communication means is arranged in the front portion of the air bag and is separated from the backrest, and wherein the air bag includes a second defining means connected to the first defining means, the second defining means extending in a vertical direction of the air bag and defining the communication means.

5. The air bag device according to claim 4, wherein the second defining means is formed by joining or connecting parts of opposing inner surfaces of the air bag.

6. The air bag device according to claim 4, wherein the second defining means guides gas, which is discharged from the inflator toward the lower chamber, to the upper chamber.

7. An air bag device installed in a backrest of a seat for passenger safety, the air bag device comprising:
   a gas discharging means arranged in the backrest for discharging gas;
   an air bag connected to the gas discharging means and including an upper chamber and a lower chamber, each being inflated by discharging gas to form a single chamber, wherein the air bag includes a first defining means for defining two chambers comprising the upper chamber and the lower chamber;
   an impact reducing means for reducing impact applied to a passenger when the air bag contacts the passenger in the seat during inflation of the air bag, wherein the gas discharging means is an inflator for discharging gas toward the lower chamber, and wherein the impact reducing means is a tube connected to the inflator.

8. An air bag device installed in a backrest of a seat for passenger safety, the air bag device comprising:
   a gas discharging means arranged in the backrest for discharging gas;
   an air bag connected to the gas discharging means and including an upper chamber and a lower chamber, each being inflated by discharging gas to form a single chamber, wherein the air bag includes a first defining means for defining two chambers comprising the upper chamber and the lower chamber;
   an impact reducing means for reducing impact applied to a passenger when the air bag contacts the passenger in the seat during inflation of the air bag, wherein the gas discharging means is an inflator for discharging gas toward the lower chamber, and wherein the impact reducing means is a tether arranged in the lower chamber of the air bag opposing a direction of gas discharge.

* * * * *